United States Patent
Makeev et al.

(10) Patent No.: US 12,374,067 B2
(45) Date of Patent: Jul. 29, 2025

(54) LAYERED CLOTHING THAT CONFORMS TO AN UNDERLYING BODY AND/OR CLOTHING LAYER

(71) Applicant: Roblox Corporation, San Mateo, CA (US)

(72) Inventors: Sergei Makeev, Foster City, CA (US); Satheesh Ganapathi Subramanian, San Ramon, CA (US); David B. Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 148 days.

(21) Appl. No.: 18/189,682

(22) Filed: Mar. 24, 2023

(65) Prior Publication Data
US 2023/0298297 A1    Sep. 21, 2023

Related U.S. Application Data

(63) Continuation of application No. 17/375,066, filed on Jul. 14, 2021, now Pat. No. 11,615,601.
(Continued)

(51) Int. Cl.
G06T 19/20    (2011.01)
A63F 13/52    (2014.01)

(52) U.S. Cl.
CPC .............. *G06T 19/20* (2013.01); *A63F 13/52* (2014.09); *A63F 2300/66* (2013.01); *G06T 2219/2021* (2013.01)

(58) Field of Classification Search
None
See application file for complete search history.

(56) References Cited

U.S. PATENT DOCUMENTS

| 11,321,916 B1 | 5/2022 | Zhang et al. |
| 2007/0273711 A1 | 11/2007 | Maffei |

(Continued)

FOREIGN PATENT DOCUMENTS

| EP | 3 029 635 | 6/2016 |
| JP | 2003103047 | 4/2003 |

(Continued)

OTHER PUBLICATIONS

"APB: Creating a Powerful Customisation System for a Persistent Online Action Game", Retrieved from Internet: https://macropolygon.files.wordpress.com/2010/08/apb_customisation_gdc2010.pptx, 2010, 49 pages.

(Continued)

*Primary Examiner* — Andrew G Yang
(74) *Attorney, Agent, or Firm* — IP SPRING

(57) ABSTRACT

An automated cage-to-cage fitting technique is used to fit arbitrary three-dimensional (3D) geometry to arbitrary target 3D geometry for 3D avatars in a 3D environment, such as an online game. Each graphical representation of items of clothing is provided with an inner cage and with an outer cage. The inner cage of a clothing item (a current layer) is mapped to the outer cage of another clothing item (a previous/underlying layer) that has already been fitted on the 3D avatar. This mapping enables the current layer to conform to the shape of the previous layer. The technique allows any body geometry to be fitted with any clothing geometry, including enabling layers of clothing to be fitted over underlying layer(s) of clothing, thereby providing customization.

20 Claims, 11 Drawing Sheets

Related U.S. Application Data

(60) Provisional application No. 63/161,376, filed on Mar. 15, 2021.

(56) References Cited

U.S. PATENT DOCUMENTS

| | | |
|---|---|---|
| 2010/0321386 A1 | 12/2010 | Lin et al. |
| 2012/0075340 A1* | 3/2012 | DeRose .................. G06T 17/20 |
| | | 345/629 |
| 2013/0034276 A1 | 2/2013 | Hibbard |
| 2013/0057544 A1 | 3/2013 | Oh |
| 2014/0267268 A1 | 9/2014 | Tipton |
| 2015/0029198 A1 | 1/2015 | Sumner et al. |
| 2016/0163103 A1* | 6/2016 | DeTemmerman .... G06T 17/205 |
| | | 345/419 |
| 2016/0171296 A1 | 6/2016 | Ikenoue |
| 2016/0284018 A1 | 9/2016 | Adeyoola et al. |
| 2016/0379419 A1 | 12/2016 | Khalili et al. |
| 2017/0032579 A1 | 2/2017 | Eisemann et al. |
| 2017/0161948 A1 | 6/2017 | Hua et al. |
| 2018/0315254 A1 | 11/2018 | Grant et al. |
| 2019/0035149 A1 | 1/2019 | Chen et al. |
| 2019/0088033 A1 | 3/2019 | Kuchibotla et al. |
| 2019/0362529 A1 | 11/2019 | Wedig et al. |
| 2019/0371080 A1 | 12/2019 | Sminchisescu et al. |
| 2020/0035010 A1 | 1/2020 | Kim et al. |
| 2021/0082179 A1 | 3/2021 | Fedyukov et al. |
| 2021/0150806 A1 | 5/2021 | Guler et al. |
| 2021/0224765 A1 | 7/2021 | Siddique et al. |
| 2022/0035443 A1 | 2/2022 | Winold et al. |
| 2022/0292791 A1 | 9/2022 | Makeev et al. |

FOREIGN PATENT DOCUMENTS

| | | |
|---|---|---|
| JP | 2016-110652 | 6/2016 |
| KR | 10-2019-0070884 | 6/2019 |
| KR | 10-2019-0118213 | 10/2019 |

OTHER PUBLICATIONS

"RBF Character Conversion", Retrieved from Internet: http://www.polygon.me/2018/08/rbf-character-conversion.html, Aug. 9, 2018, 3 pages.
Agafonkin, "Edgebreaker, the heart of Google Draco", Retrieved from Internet: https://observablehq.com/@mourner/edgebreaker-the-heart-of-google-draco, Oct. 16, 2019, 9 pages.
Anjyo, et al., "Scattered Data Interpolation for Computer Games", Siggraph 2014 Course Notes, 2014, 69 pages.
Appleby, et al., "Punching Above Your Weight: Small Art Teams, Big Games", Video; retrieved from Internet: https://www.gdcvault.com/play/1014359/Punching-Above-Your-Weight-Small, 2011, 4 pages.
Bailey, et al., "Fast and deep deformation approximations", ACM Transactions on Graphics, vol. 37, Issue 4, Aug. 2018, 12 pages.
Barak, "Adaptive Clothing System in Kingdom Come: Deliverance", Retrieved from Internet: https://www.gdcvault.com/play/1022822/Adaptive-Clothing-System-in-Kingdom; see also video at: https://www.gdcvault.com/play/1022771/Adaptive-Clothing-System-in-Kingdom, 2015, 39 pages.
Botsch, et al., "Real-Time Shape Editing using Radial Basis Functions", Eurographics 2005, vol. 24, No. 3, 2005, 11 pages.
De Goes, et al., "Mesh Wrap based on Affine-Invariant Coordinates", ACM SIGGRAPH 2019 Talks, 2019, 2 pages.
Desbrun, et al., "Implicit Fairing of Irregular Meshes using Diffusion and Curvature Flow", Siggraph '99: Proceedings of the 26th Annual Conference on Computer Graphics and Interactive Techniques, Jul. 1999, 8 pages.
Feng, et al., "Avatar Reshaping and Automatic Rigging Using a Deformable Model", Proceedings of the 8th ACM Siggraph Conference on Motion in Games, 2015, 8 pages.
Fortier, "Universal Character System in Saints Row 2", Video; retrieved from Internet: https://www.gdcvault.com/play/1289/Universal-Character-System-in-SAINTS, 2009, 3 pages.
Gagliardi, et al., "A Two-Step Mesh Adaption Tool Based on RBF with application to Turbomachinery Optimization Loops", Evolutionary and Deterministic Methods for Design Optimization and Control With Applications to Industrial and Societal Problems. Springer, Cham, 2019, pp. 127-141.
Godard, "Plugin and Nodal Demo Reel 2016", Video; retrieved from Internet: https://vimeo.com/166291982#t=3m33s, 2016, 3 pages.
Kim, et al., "GeoFilter: Geometric Selection of Mesh Filter Parameters", Eurographics, Computer Graphics Forum, available at https://faculty.cc.gatech.edu/~jarek/papers/GeoFilter.pdf, Jan. 31, 2005, 8 pages.
Lalleve, et al., "Character Pipeline and Customization System for 'Far Cry Primal'", Retrieved from Internet: https://www.gdcvault.com/play/1024578/Character-Pipeline-and-Customization-System, 2017, 104 pages.
Li, et al., "Fitting 3D garment models onto individual human models", Computers and Graphics 34, 2010, pp. 742-755.
Nair, "Innovations in The Sims 4 Character Creator", Retrieved from Internet: https://www.gdcvault.com/play/1022086/Innovations-in-The-Sims-4, 2015, 89 pages.
Niu, et al., "Radial basis function mesh deformation based on dynamic control points", Aerospace Science and Technology 64; retrieved from Internet: https://dacemirror.sci-hub.tw/journal-article/b485b3a622b0953d5a8c898a5a6cc563/niu2017.pdf (Abstract), 2017, pp. 122-132.
Rossignac, "Edgebreaker: Connectivity compression for triangle meshes", GVU Technical Report GIT-GVU-98-35, IEEE Transactions on Visualization and Computer Graphics, Jan.-Mar. 1999, 15 pages.
Schiffmann, "RBF Interpolation for Mesh Deformation", Retrieved from Internet: https://imsc.uni-graz.at/haasegu/Lectures/GPU_CUDA/WS16/2016-11-03-HPC1-Schiffmann-RBF.pdf, 2016, 12 pages.
Selim MM, et al., "Mesh Deformation Approaches—A Survey", J. Phys. Math., vol. 7, Issue 2, 2016, 9 pages.
Shepherd, "Building Customizable Characters for Bungie's Destiny", Video; retrieved from Internet: https://www.gdcvault.com/play/1020412/Building-Customizable-Characters-for-Bungie, 2014, 4 pages.
Stokan, "Ultimate Customization in Character Creation—Challenges and Innovations", Video; retrieved from Internet: https://www.gdcvault.com/play/1014370/Ultimate-Customization-in-Character-Creation, 2011, 4 pages.
Taubin, "A Signal Processing Approach To Fair Surface Design", Siggraph '95: Proceedings of the 22nd Annual Conference on Computer Graphics and Interactive Techniques, Sep. 1995, 8 pages.
Torok, et al., "REDengine 3 Character Pipeline", Retrieved from Internet: http://fileserv.polter.pl/1594-CDPRED_SIGGRAPH.pdf, 2013, 53 pages.
USPTO, Written Opinion for International Patent Application No. PCT/US2022/046523, Feb. 8, 2023, 11 pages.
USPTO, International Search Report for International Patent Application No. PCT/US2022/046523, Feb. 8, 2023, 2 pages.
USPTO, International Search Report for International Patent Application No. PCT/US2022/046528, Jan. 31, 2023, 2 pages.
USPTO, Written Opinion for International Patent Application No. PCT/US2022/046528, Jan. 31, 2023, 6 pages.
USPTO, Written Opinion for International Patent Application No. PCT/US2022/015246, May 11, 2022, 12 pages.
USPTO, International Search Report for International Patent Application No. PCT/US2022/015246, May 11, 2022, 2 pages.
USPTO, Non-final Office Action for U.S. Appl. No. 17/375,066, May 24, 2022, 15 pages.
USPTO, Notice of Allowance for U.S. Appl. No. 17/375,066, Nov. 8, 2022, 9 pages.
Vaisse, "Ubisoft Cloth Simulation: Performance Postmortem and Journey from C++ to Computer Shaders", Retrieved from Internet: https://www.gdcvault.com/play/1022421/Ubisoft-Cloth-Simulation-Performance-Postmortem, 2015, 97 pages.
Wang, et al., "Delaunay graph-based moving mesh method with damping functions", Chinese Journal of Aeronautics, vol. 31, Issue 11, Nov. 2018, pp. 2093-2103.

(56) References Cited

OTHER PUBLICATIONS

Wang, et al., "Mesh deformation on 3D complex configurations using multistep radial basis functions interpolation", Chinese Journal of Aeronautics, 31(4), 2018, pp. 660-671.
"EPO", Extended European Search Report (EESR), Application No. 22771894.7, Jan. 27, 2025, 8 pages.
"Final Office Action cited in U.S. Appl. No. 17/965,247", Sep. 26, 2024, 19 Pages.
"Japanese Notice of Allowance in Japanese Application No. 2024-521295", Feb. 18, 2025, 5 Pages.
"Japanese Notice of Allowance in JP Application No. 2024-520607", Feb. 18, 2025, 5 pages.
"Japanese Office Action in JP Application No. 2023-556822", Sep. 9, 2024, 12 Pages.
"Non-Final Office Action in U.S. Appl. No. 17/965,247", Jan. 16, 2025, 13 Pages.
"Notice of Allowance in U.S. Appl. No. 17/965,213", Aug. 22, 2024, 8 Pages.
"Radial Basis Functions Mesh Morphing—A Comparison Between the Bi-harmonic Spline and the Wendland C2 Radial Function", 20th International Conference on Computational Science—ICCS 2020, Springer, DOI:10.1007/978-3-030-50433-5_23; XP047553069,, Jun. 3-5, 2020, pp. 294-308.
"SMPLicit: Topology-aware Generative Model for Clothed People", Proceedings of the IEEE/CVF Conference on Computer Vision and Pattern Recognition (CVPR); arXiv.org (Cornell University); https://arxiv.org/pdf/2103.06871v1; XP093236221, Mar. 11, 2021, pp. 1-11.
USPTO, Non-final Office Action for U.S. Appl. No. 17/965,213, Mar. 11, 2024, 16 pages.
USPTO, Non-final Office Action for U.S. Appl. No. 17/965,247, Mar. 22, 2024, 13 pages.
Shiyi Huang, "Customized 3D Clothes Modeling for Virtual Try-On System Based on Multiple Kinects", 2015, 133 pages.
"Korean Office Action In Application No. 10-2023-7035187", Apr. 29, 2025.

* cited by examiner

ACCESSORIES:
- FRONT
- BACK
- HAT
- SHOULDER
920

HAIR
918

ACCESSORIES:
- NECK
- PIERCINGS (EAR, NOSE, BROW)
916

CLOTHING:
OUTER WEAR
914

SHOES
912

CLOTHING:
INNER WEAR
910

SOCKS
904

ACCESSORIES:
HAND
906

MAKEUP
908

AVATAR BODY 902

LAYERED CLOTHING THAT CONFORMS TO AN UNDERLYING BODY AND/OR CLOTHING LAYER

CROSS-REFERENCE TO RELATED APPLICATION

This application is a continuation of and claims the priority under 35 U.S.C. § 120 to U.S. patent application Ser. No. 17/375,066, filed on Jul. 14, 2021, now U.S. Pat. No. 11,615,601, and titled LAYERED CLOTHING THAT CONFORMS TO AN UNDERLYING BODY AND/OR CLOTHING LAYER, which is a non-provisional application that claims priority under 35 U.S.C. § 119(e) to U.S. Provisional Patent Application No. 63/161,376, filed on Mar. 15, 2021. Both U.S. patent application Ser. No. 17/375, 066 and U.S. Provisional Patent Application No. 63/161,376 are incorporated herein by reference in their entirety.

TECHNICAL FIELD

This disclosure relates generally to computer graphics, and more particularly but not exclusively, relates to methods, systems, and computer readable media to provide graphical representations of layered clothing over an underlying graphical object, such as layered clothing for three-dimensional (3D) avatars in an electronic game or other 3D environment.

BACKGROUND

Multi-user electronic gaming environments typically involve the use of avatars, which represent the players in an electronic game. Avatars are often three-dimensional (3D) avatars that differ in geometry/shapes from one avatar to another. For example, avatars may have different body shapes (e.g., tall, short, muscular, thin, male, female, human, animal, alien, etc.), number and types of limbs, and are customizable with multiple pieces clothing and/or accessories worn by the avatar (e.g., shirt worn over the torso, jacket worn over the shirt, scarf worn over the jacket, hat worn over the head, etc.).

To provide clothing and/or accessories for avatars, game developers traditionally use a unified topology for the body and clothing, so that the geometry of the clothing fits the geometry of the body. Thus, these techniques use pre-defined shapes to achieve some rudimentary geometry-to-geometry matching between the clothing and the body. However, such techniques (due to the presence of pre-defined shapes) provide limited capability to customize body shapes and clothing.

When more customization is needed (e.g., due to non-uniform body shapes of avatars and clothing), more intensive user input and graphical programming is required. For instance, these techniques require the creator user (e.g., one that provides the clothing items and/or different body shapes) to perform complex computations in order to graphically generate clothing having geometry that matches the geometry of the body. These processes are complex, and also require close coordination and cooperation between body shape creators and clothing creators.

SUMMARY

According to a first aspect, a computer-implemented method provides layered clothing on three-dimensional (3D) avatars. The method includes:

identifying body feature points of a body cage of a 3D avatar having an avatar body;

mapping inner feature points, of an inner cage of a first piece of clothing, to the body feature points of the body cage to obtain a deformed first piece of clothing that conforms to the avatar body;

fitting the deformed first piece of clothing onto the avatar body by at least partially enveloping the avatar body with the deformed first piece of clothing;

mapping inner feature points, of an inner cage of a second piece of clothing, to outer feature points of an outer cage of the deformed first piece of clothing to obtain a deformed second piece of clothing that conforms to the outer cage of the first piece of clothing; and fitting the deformed second piece of clothing onto the avatar body by at least partially enveloping the avatar body, having the deformed first piece of clothing fitted thereon, with the deformed second piece of clothing.

According to another aspect, a non-transitory computer-readable medium is provided that has instructions stored thereon that, responsive to execution by a processor, cause the processor to perform or control performance of operations. The operations include:

identify body feature points of a body cage of a 3D avatar having an avatar body;

map inner feature points, of an inner cage of a first piece of clothing, to the body feature points of the body cage to obtain a deformed first piece of clothing that conforms to the avatar body;

fit the deformed first piece of clothing onto the avatar body by at least partially enveloping the avatar body with the deformed first piece of clothing;

map inner feature points, of an inner cage of a second piece of clothing, to outer feature points of an outer cage of the deformed first piece of clothing to obtain a deformed second piece of clothing that conforms to the outer cage of the first piece of clothing; and fit the deformed second piece of clothing onto the avatar body by at least partially enveloping the avatar body, having the deformed first piece of clothing fitted thereon, with the deformed second piece of clothing.

According to still another aspect, an apparatus is provided that includes:

a display device operable to present three-dimensional (3D) avatars having layered clothing;

a memory having a game application stored therein; and a processor coupled to the display device and to the memory, and operable to execute the game application stored in the memory, wherein the game application is executable by the processor to cause the processor to perform or control performance of operations that include:

identify body feature points of a body cage of a 3D avatar having an avatar body;

map inner feature points, of an inner cage of a first piece of clothing, to the body feature points of the body cage to obtain a deformed first piece of clothing that conforms to the avatar body;

fit the deformed first piece of clothing onto the avatar body by at least partially enveloping the avatar body with the deformed first piece of clothing;

map inner feature points, of an inner cage of a second piece of clothing, to outer feature points of an outer cage of the deformed first piece of clothing to obtain a deformed second piece of clothing that conforms to the outer cage of the first piece of clothing; and fit the deformed second piece of clothing onto the avatar body by at least partially enveloping the avatar body, having the deformed first piece of clothing fitted thereon, with the deformed second piece of clothing.

BRIEF DESCRIPTION OF THE DRAWINGS

FIG. 9 shows a diagram representing logical hierarchical layering of objects, such as clothing, over an avatar body, in accordance with some implementations.

DETAILED DESCRIPTION

Figure 2:
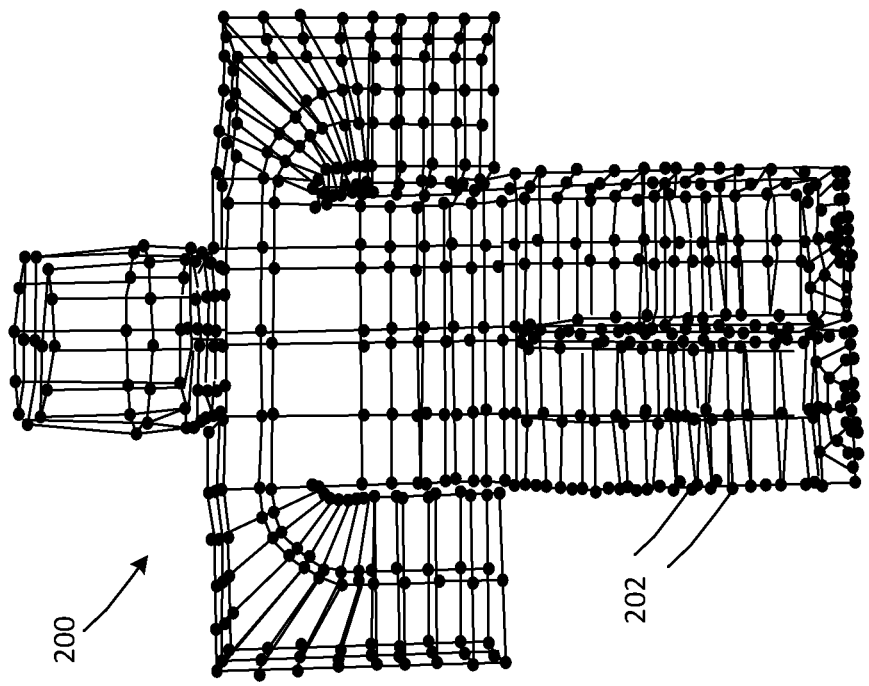
FIG. 2 shows another example body cage, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "one embodiment", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks in 3D environments, by using an automated cage-to-cage fitting technique for 3D avatars. The technique allows any body geometry to be fitted with any clothing geometry, including enabling layers of clothing to be fitted over underlying layer(s) of clothing, thereby providing customization without the limits imposed by pre-defined geometries or requiring complex computations to make a clothing item compatible with arbitrary body shapes of avatars or other clothing items. The cage-to-cage fitting is also performed algorithmically by a gaming platform or gaming software (or other platform/software that operates to provide a 3D environment), without requiring avatar creators (also referred to as avatar body creators, or body creators) or clothing item creators to perform complex computations. The terms "clothing" or "clothing item" used herein are understood to include clothing and accessories, and any other item that can be placed on an avatar in relation to specific parts of an avatar cage.

The implementations described herein enable the work of the avatar body creators to be decoupled from the work of the clothing creators. For example, avatar body creators can create bodies having geometries of any desired/customized shape and size, and publish the bodies in a body library hosted by a 3D platform. Clothing creators can independently create generic templates of any piece of clothing, such as shirts, pants, etc., and publish the clothing templates in a clothing library hosted by the 3D platform.

Purely for purposes of illustration and explanation, various embodiments are described herein in the context of 3D avatars that are used in a 3D game provided by a gaming platform. It is appreciated that such gaming environments are merely examples. Other implementations of the cage-to-cage layering techniques described herein may be applied to other types of 3D environments, such as a virtual reality (VR) conference, a 3D session (e.g., an online lecture or other type of presentation involving 3D avatars), an augmented reality (AR) session, or in other types of 3D environments that may include one or more users that are represented in the 3D environment by one or more 3D avatars.

At runtime during a game or other 3D session, a player/user accesses the body library to select a particular body, and accesses the clothing library to select pieces of clothing to place on the selected body. The 3D environment platform that presents the avatars then implements the cage-to-cage fitting techniques to adjust (by suitable deformations, determined automatically) a piece of clothing to conform to the shape of the body, thereby automatically fitting the piece of clothing onto the body (and any intermediate layers, if worn by the avatar). The user can further select an additional piece of clothing to fit over an underlying piece of clothing (layered clothing), with the additional piece of clothing deforming to match the geometry of the underlying piece of clothing.

The implementations described herein are based on the concept of "cages" and "meshes." A body mesh is the actual visible geometry of an avatar. A body mesh includes the graphical representation of the arms, legs, torso, head parts, etc. and can be of arbitrary shape, size, and geometric topology. Analogously, a clothing mesh can be any arbitrary mesh that graphically represents a piece of clothing, such as a shirt, pants, hat, shoes, etc. or parts thereof.

In comparison, a cage represents an envelope of features points around the avatar body that is much simpler than the body mesh and has weak correspondence to the corresponding vertices of the body mesh. As will be explained in further detail later below, a cage may also be used to represent not only the set of feature points on an avatar body, but also a set of feature points on a piece of clothing.

Figure 1:
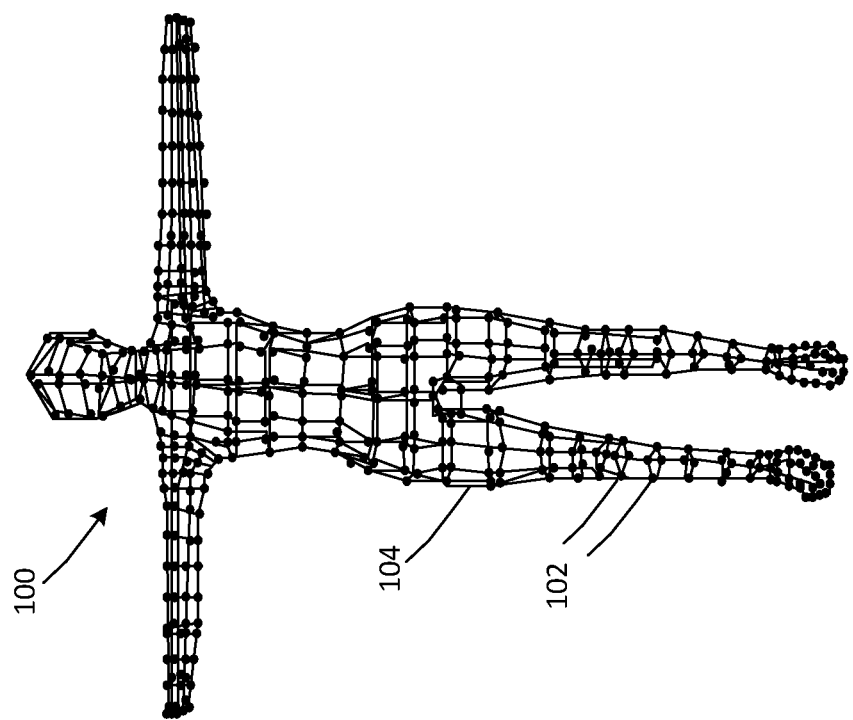
FIG. 1 shows an example body cage, in accordance with some implementations.

FIG. 1 shows an example body cage 100, in accordance with some implementations. The body cage 100 in the example of FIG. 1 is an outer cage that envelopes or is superimposed on the external surface/contours of a humanoid body shape that acts as a mannequin.

The body cage 100 comprises a plurality of feature points 102 that define or otherwise identify or correspond to the shape of the mannequin. In some implementations, the feature points 102 are formed by the vertices of segments/sides 104 of multiple polygons (or other geometric shape) on the mannequin. In some implementations, the feature points 102 may be discrete points, without necessarily being formed by vertices of any polygons.

The body cage 100 of FIG. 1 provides an example of a low-resolution body cage with 642 feature points (or some other number of feature points) for a humanoid body geometry that excludes fingers. Other examples may use a body cage with 475 feature points. A body cage of a humanoid geometry that includes fingers might have 1164 feature points (or some other number of feature points), for example. Higher resolution body cages may include 2716 feature points (or some other number of feature points). These numbers (and ranges thereof) of feature points are just some examples—the number of feature points may vary from one implementation to another depending on factors such as desired resolution, processing capability of the 3D platform, user preferences, size/shape of the mannequin, etc.

Cages may be provided for any arbitrary avatar body shape or clothing shape. For instance, FIG. 2 shows another example body cage 200, in accordance with some implementations. The body cage 200 in the example of FIG. 2 is an outer cage that envelopes or is superimposed on the external surface/contours of a generic gaming avatar body shape. Compared to the body cage 100 of FIG. 1, the body cage 200 of FIG. 2 may have the same number of feature points. In other implementations, the body cage 200 may have a number of feature points that is different in number compared to the body cage 100, such as a fewer or greater number of feature points 202 as a consequence of a different (simpler or more complex) geometric shape of the gaming avatar and/or based on other factor(s). Thus, the number of feature points from one body cage to another may be selected as appropriate for different body shapes or other body properties.

Figure 3:
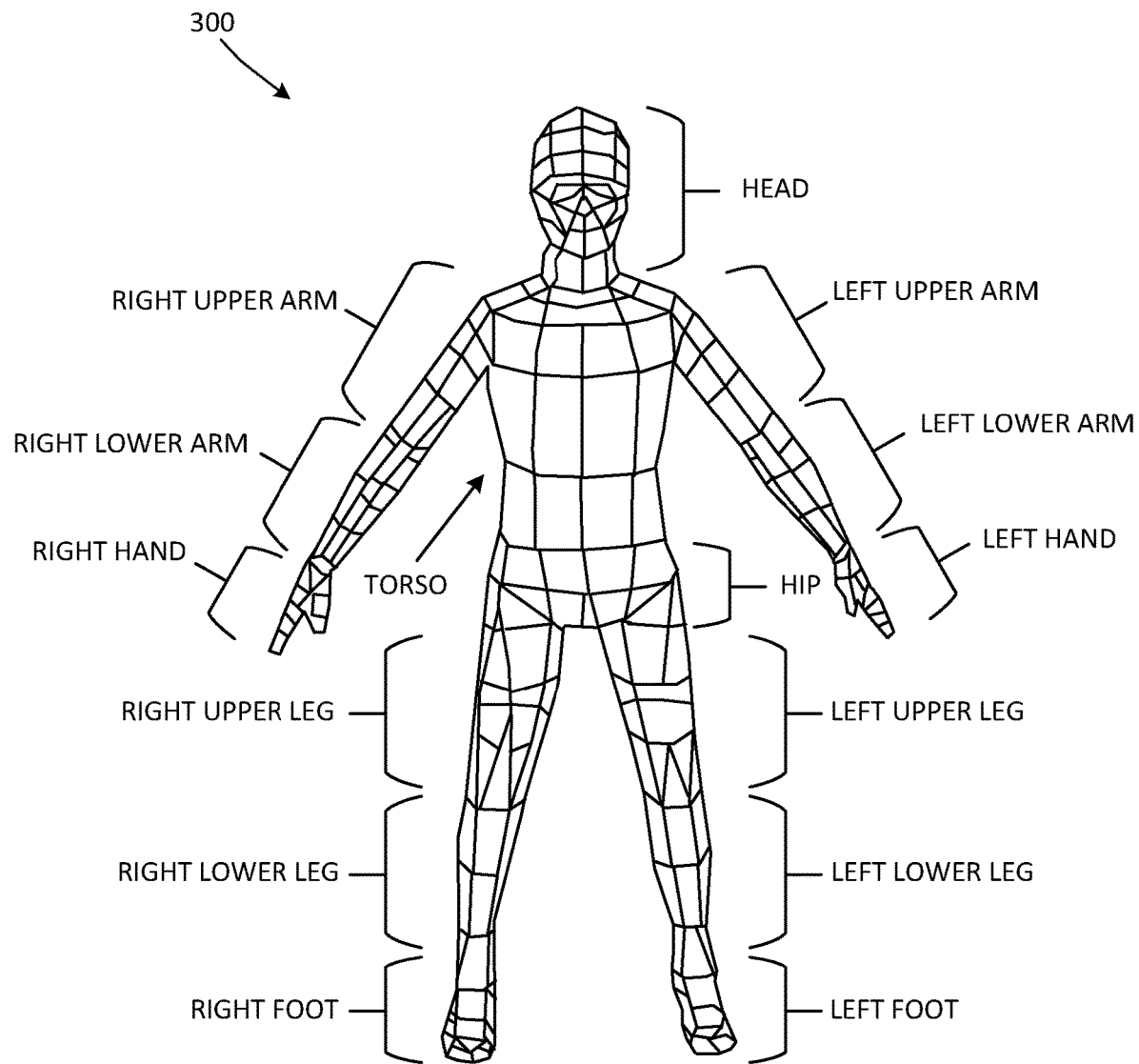
FIG. 3 shows an example of portions of a body cage that are grouped into corresponding body parts, in accordance with some implementations.

In some implementations, for bandwidth and performance/efficiency purposes or other reason(s), the number of feature points may be reduced to a smaller number than those provided above, such as 475 feature points (or some other number of feature points). Furthermore, in some implementations, the feature points (vertices) in a body cage may be arranged into 15 groups that each represent a portion of the body shape. FIG. 3 shows an example of portions of a body cage 300 that are grouped into corresponding body parts, in accordance with some implementations.

More particularly, the 15 body parts shown in FIG. 3 may be (for a humanoid mannequin): head, torso, hip, right foot, left foot, left lower leg, right lower leg, left upper leg, right upper leg, left hand, right hand, left lower arm, right lower arm, left upper arm, and right upper arm. The number of parts in any body shape may be greater or fewer than the 15 body parts shown. For example, a "one-armed" avatar character might have 12 (as opposed to 15) body parts, due to the omission of a hand, lower arm, and upper arm. Furthermore, other body shapes may involve a fewer or greater numbers of body parts, depending on factors such as body geometry, desired resolution, processing capability, type of avatar character (e.g., animal, alien, monster, and so forth), etc.

Each of the 15 groups/parts in FIG. 3 includes the feature points that define that part of the avatar body. Such group(s) of feature points can in turn be mapped to a corresponding piece of clothing. For example, the feature points in the body cage 300 that define the left/right lower arms, the left/right upper arms, and the torso may be used as an outer cage to be mapped with an inner cage of a jacket, in that a graphical representation of jacket is made up of graphical meshes that render left/right arms and a torso of the jacket that logically and correspondingly fit over left/right arms and a torso of an avatar body.

Moreover, this separation into multiple groups (such as shown in FIG. 3) enable customized fitting of a piece of clothing over non-typical body shapes. For instance, a 3D avatar may be in the form of a "one-armed" avatar character that is missing the left arm. Thus, the body cage for that 3D avatar would be missing the groups of feature points corresponding to the left hand, left lower arm, and left upper arm. When a jacket is subsequently selected for fitting over that 3D avatar, the right lower arm, right upper arm, and torso of the jacket can be deformed to fit over the corresponding right lower arm, right upper arm, and torso of the 3D avatar (body mannequin), and the left lower arm and the left upper arm of the jacket are not deformed (e.g., remains rigid in its original form from its parent space) since there is no left arm cage in the body mannequin to deform against.

Figure 4:
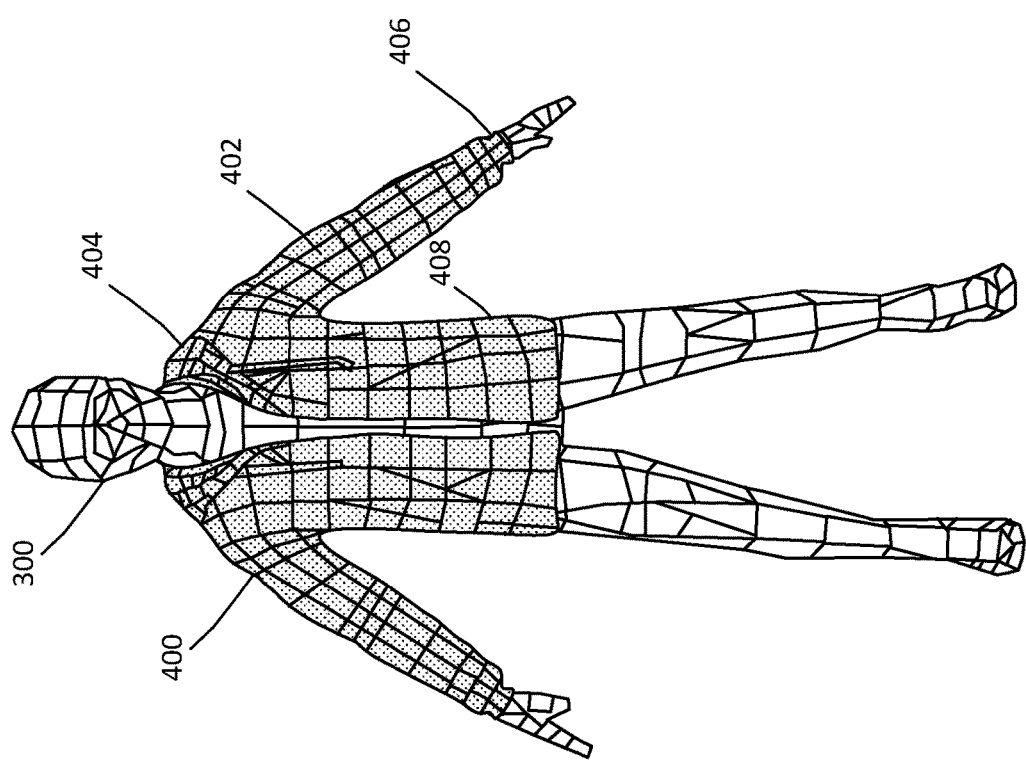
FIG. 4 shows an example of a clothing layer deformed over a body cage, in accordance with some implementations.

FIG. 4 shows an example of a clothing layer 400 deformed over a body cage (such as the body cage 300 shown in FIG. 3), in accordance with some implementations. The clothing layer 400 is a graphical representation of a jacket (shown in gray shading in FIG. 4) having parts that may be generated/rendered using a polygon mesh 402 that is comprised of a collection of vertices, edges, and faces.

The clothing layer 400 includes an inner cage (not shown in FIG. 4) having feature points that correspond to the feature points of the body cage 300. Specifically, the feature points of the inner cage of the clothing layer 400 are mapped to the feature points of the body cage 300 that make up the left and right lower arms, the left and right upper arms, and the torso. In some implementations, this mapping includes mapping the feature points of the inner cage of the clothing layer 400 directly onto the coordinate locations of the corresponding feature points of the arms and torso of the body cage 300. Such mapping may involve a 1:1 correspondence when both cages have same number of feature points, and the mapping may be n:1 or 1:n (wherein n is an integer greater than 1), in which case multiple feature points in one cage may be mapped to the same feature point of the other cage (or some feature points may be unmapped).

The clothing layer 400 includes an outer cage having feature points that are spaced apart from and linked to the corresponding feature points of its inner cage of the clothing layer 400. The feature points of the outer cage of the clothing layer 400 define or are otherwise located along the external surface contours/geometry of the jacket, so as to define features such as a hood 404, cuffs 406, straight-cut torso 408, etc. of the jacket.

According to various implementations, the spatial distances (e.g., a spatial distance between a feature point of the inner cage of the clothing layer 400 and a corresponding feature point of the outer cage of the clothing layer 400) are kept constant during the course of fitting the clothing layer 400 over an outer cage of an existing layer (or avatar body). In this manner, the feature points of the inner cage of the clothing layer 400 may be mapped to the feature points of the body cage 300, so as to "fit" the inside of the jacket over the avatar's torso and arms. Then, with the distances between the feature points of the inner cage of the clothing layer 400 and the corresponding feature points of the outer cage of the clothing layer 400 being kept constant, the outer contours of the jacket can also be deformed so as to match the shape of the avatar body, thereby resulting in at least partial preservation of the visual appearance (graphical representation) of the hood, cuffs, straight-cut torso and other surface features of the jacket while at the same time matching the shape of the avatar body as shown in FIG. 4. In this manner, the clothing layer 400 can be deformed in any appropriate manner so as to fit any arbitrary shape/size of an avatar body (body cage), such as tall, short, slim, muscular, humanoid, animal, alien, etc.

Figure 5:
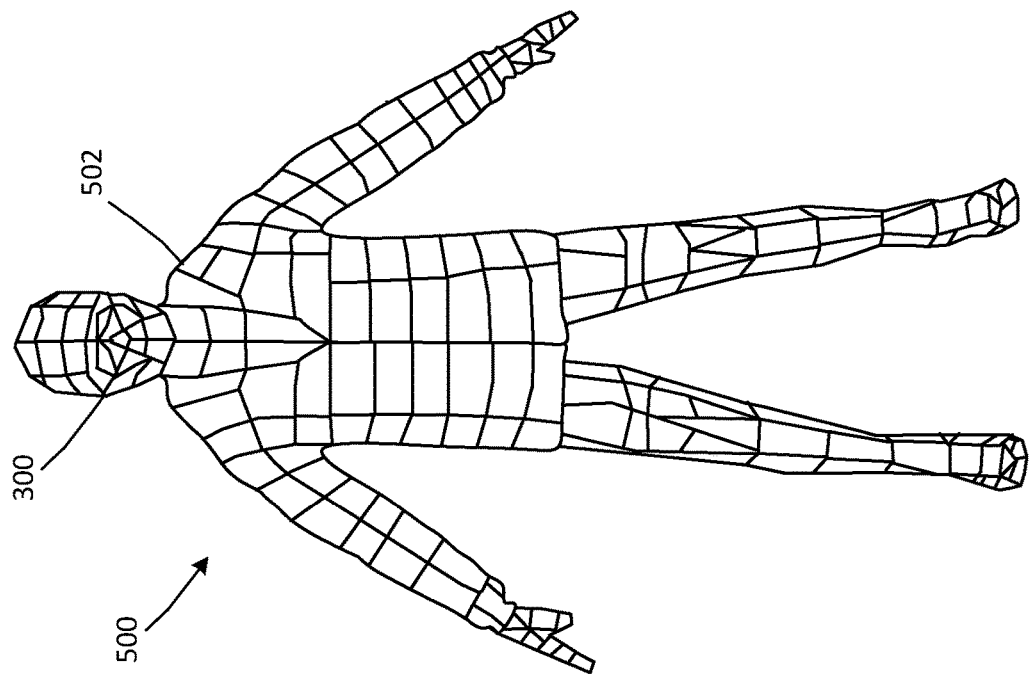
FIG. 5 shows an example of an outer cage formed based on the clothing layer and portions of the body cage of FIG. 4, in accordance with some implementations.

In some implementations, additional clothing layers over other clothing layer(s) can be placed (e.g., in response to user selection). FIG. 5 shows an example of the clothing layer and portions of the body cage 300 of FIG. 4 being used to form an outer cage 500, in accordance with some implementations. More specifically, the feature points of the outer cage of the clothing layer 400 of FIG. 4 are now combined with the feature points of the body cage 300, so as to result in a composite outer cage 500 that is made up of feature points of exposed portions of the body cage 300 and feature points along the exterior surface of the jacket. For example, the exposed outer surfaces of the jacket (formed by the body, hood, and sleeves of the jacket) provide a set of feature points and the exposed legs, hands, head, and part of the chest of the body that are not covered by the jacket provide another set of feature points, and these two sets of feature points (combined) provide the feature points of the outer cage 500.

The feature points of the outer cage 500 in FIG. 5, which correspond to and define the outer surface/shape of the jacket, may be the same feature points of the outer cage of the clothing layer 400 of FIG. 4. In some implementations, different and/or additional and/or fewer feature points may be used for the region of the jacket in the outer cage 500 in FIG. 5, as compared to the feature points for the outer cage of the jacket (clothing layer 400) of FIG. 4. For instance, additional feature points may be computed for the outer cage 500 encompassed by the jacket area (as compared to the outer cage of the clothing layer 400 of FIG. 4), if higher resolution or more precise fitting is desired for the next layer of clothing above the outer cage 500. Analogously, feature points may be computed for the outer cage 500 encompassed by the jacket area (as compared to the outer cage of the clothing layer 400), if a lower resolution or less precise fitting is desired for the next layer of clothing above the outer cage 500 and/or due to other considerations such as processing/bandwidth efficiency improvements provided by using fewer feature points when possible.

In operation, if the user wishes to fit an additional clothing layer (such as an overcoat or other article of clothing) over the jacket (clothing layer 400) and/or over other parts of the avatar body, then the feature points of the inner cage of such additional clothing layer are mapped to the corresponding feature points of the outer cage 500. Deformation (e.g., fitting) can thus be performed in a manner similar to that described with respect to FIG. 4.

Thus, in accordance with the examples of FIGS. 4 and 5 for layering clothing, a first layer of clothing (clothing layer 400) is wrapped around the body by matching the feature points of the "outer cage" (body cage 300) of the avatar body with the feature points of the "inner cage" of the first layer of clothing. This matching may be done in the UV space of the cages, so as not to have to rely on the number of feature points matching exactly between the inner and outer cages. For example, the feature points may be vertices with both position and texture space coordinates. Texture space coordinates is usually expressed in a range [0,1] each for U,V coordinates. The texture space may be thought of as an "unwrapped" normalized coordinate space for the vertices. By performing the correspondence of the two sets of vertices in the UV space and not using their positions, vertex-to-vertex correspondence can be done in the normalized space there by removing the hard requirement of exact vertex to vertex index mapping.

Per techniques described herein, each avatar body and clothing item is thus associated with an "inner cage" and an "outer cage." In the case of the avatar body, the inner cage represents a default "mannequin" (and different mannequins may be provided for different avatar body shapes) and the "outer cage" of the avatar body represents the envelope around the shape of the avatar body. For the clothing items, the "inner cage" represents the inner envelope that is used to define how the clothing item wraps around an underlying body (or around a body with prior clothing layers already fitted on it), and the "outer cage" represents the way that the next layer of clothing is wrapped around this particular clothing item when worn on the avatar body.

Figure 6A:
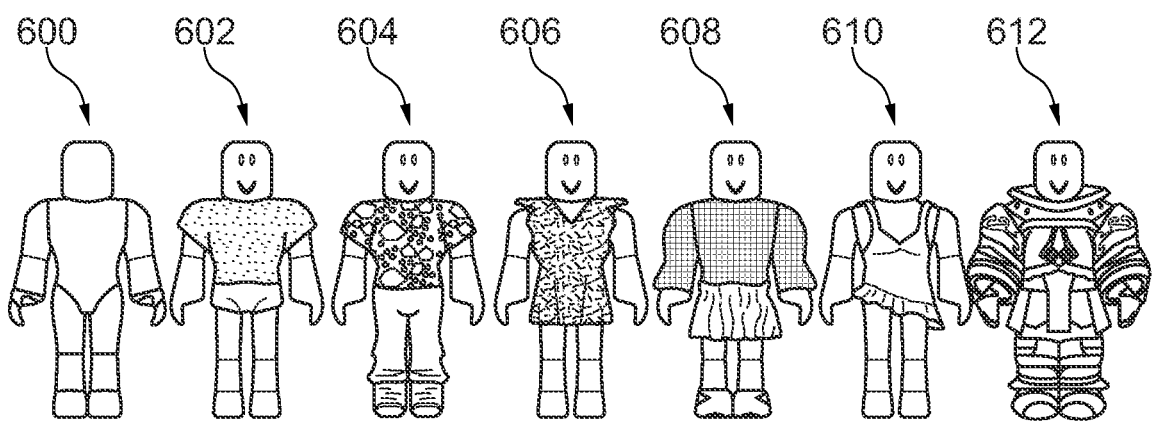
FIGS. 6A-6D show examples of clothing deformed on various avatar body shapes, in accordance with some implementations.

FIGS. 6A-6D show examples of layered clothing deformed on various avatar body shapes, in accordance with some implementations. FIG. 6A shows a mannequin 600 in the shape of a generic game player and having an outer cage made up of 15 groups of feature points such as described above with respect to FIG. 3. FIG. 6A then shows different types of clothing that are conformingly fitted onto the shape/size of the mannequin 600: 602 (shirt and shorts); 604 (shirt, pants, and sneakers); 606 (dress); 608 (blouse, skirt, and shoes); 610 (summer dress); and 612 (body armor). Moreover, the mannequin 600 can also be "skinned" with other external graphical features, such as gray skin and a smiling face in FIG. 6A.

Figure 6B:
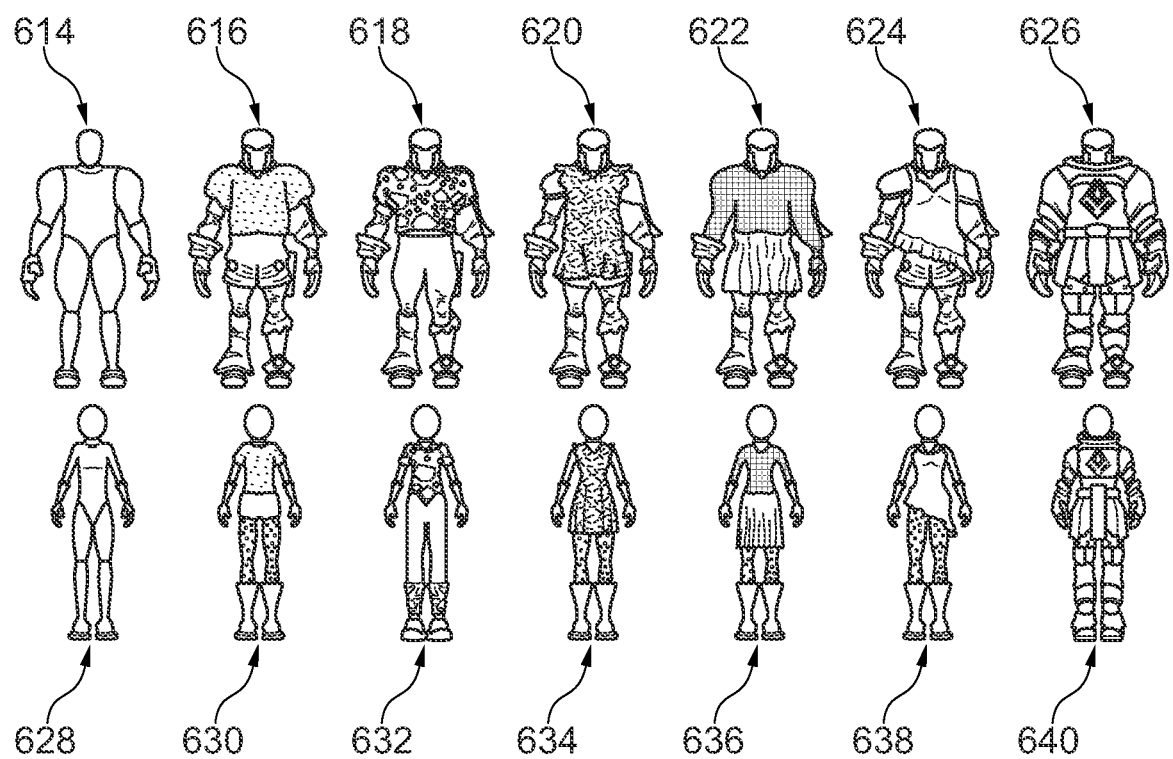

FIG. 6B shows a mannequin 614 that has a different shape/size (e.g., a muscular build and definition) than the mannequin 600 of FIG. 6A. Furthermore, 616-626 show protective armor conformingly fitted over the mannequin 614, and then the same items of clothing of FIG. 6A being deformed so as to conformingly fit as an additional layer over the protective armor.

FIG. 6B also shows another mannequin 628 that has a different shape/size (e.g., slimmer) than the mannequin 614. The mannequin 628 has a dark shirt, dark leggings, and boots conformingly fitted over it as shown at 630-640, and then the same items of clothing of FIG. 6A being deformed so as to conformingly fit as an additional layer over the dark shirt, dark leggings, and boots.

Figure 6C:
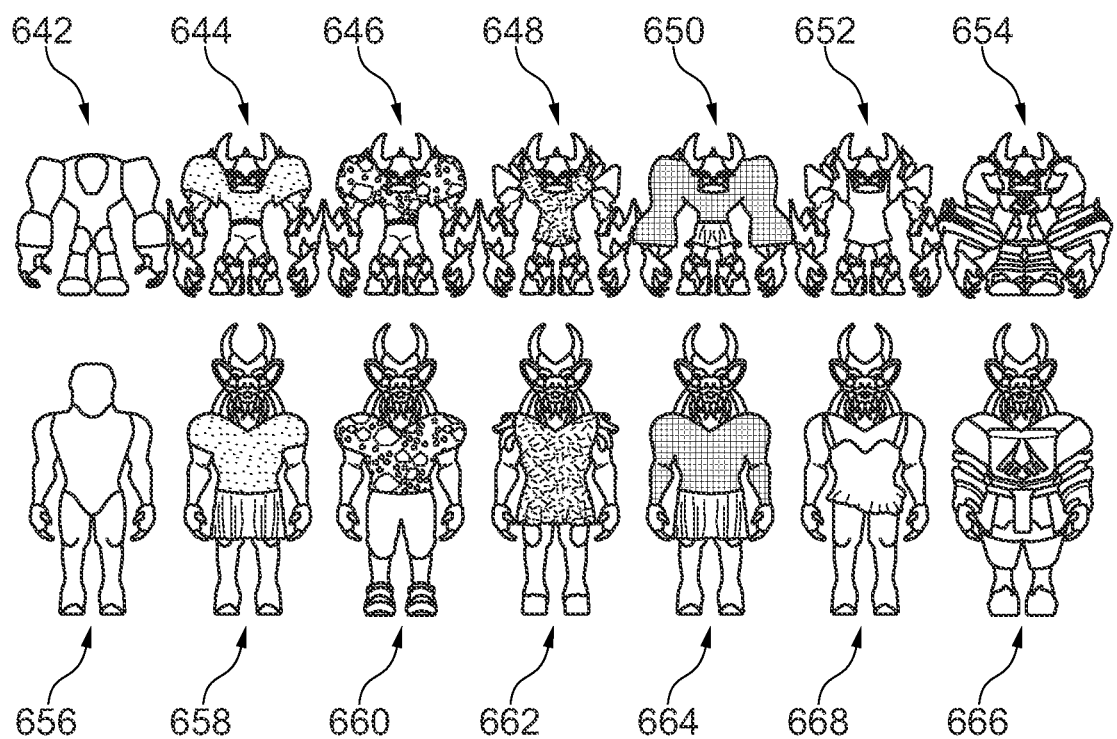

FIG. 6C shows mannequins 642 and 656 of different shapes and sizes, with both mannequins being skinned respectively at 644-654 and 658-666, so as to appear as "monsters" (e.g., an avatar with horns, claws, fangs, fierce animal-like face, and other embellishments). Furthermore, 644-654 and 658-666 then show the same items of clothing of FIG. 6A being deformed so as to conformingly fit as clothing layer(s) over the surface shapes/features of the monsters.

Figure 6D:
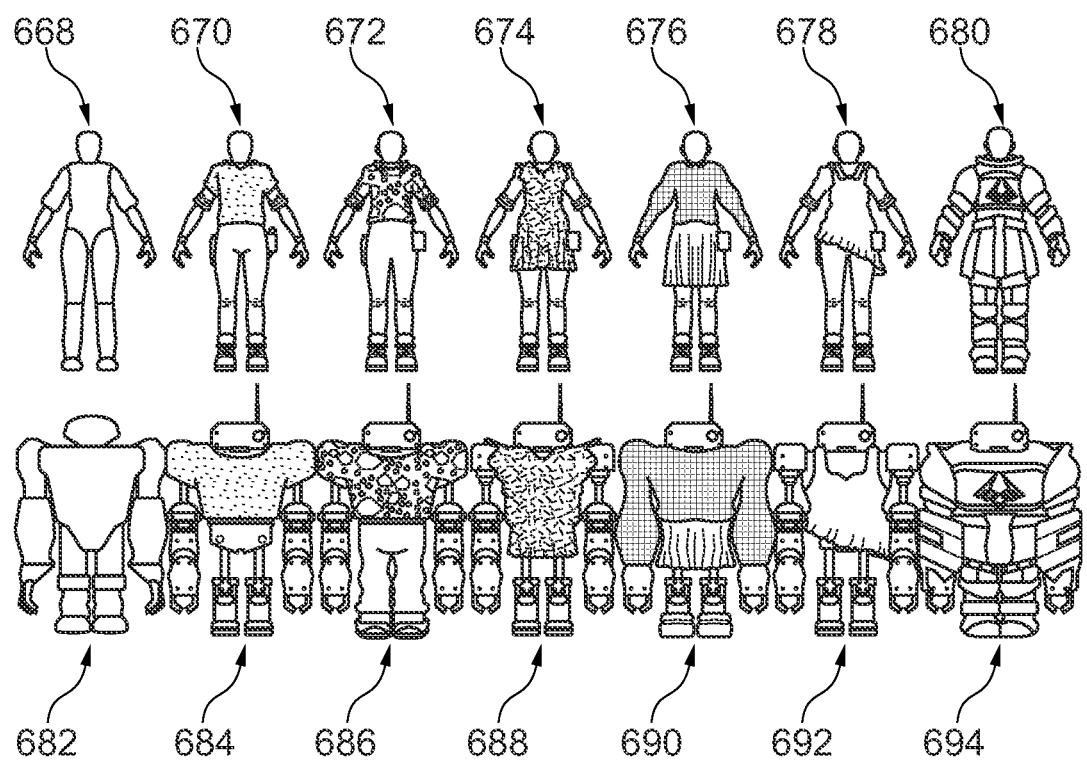

FIG. 6D shows a mannequin 668 that has a different shape/size (e.g., larger build) than the mannequin 628 of FIG. 6B. The mannequin 668 has a dark shirt, dark pants, and sneakers conformingly fitted over it as shown at 670-680, and then the same items of clothing of FIG. 6A being deformed so as to conformingly fit as an additional layer over the dark shirt, dark pants, and sneakers.

FIG. 6D also shows another mannequin 682 in the form of an "alien" (e.g., an avatar having a non-humanoid head/arm/leg shape), and 684-694 further show the mannequin 682 being skinned with alien features and/or alien clothing. Then, 684-694 show the same items of clothing of FIG. 6A being deformed so as to conformingly fit as a clothing layer over the alien features/clothing.

In accordance with various implementations, the mapping between feature points of inner and outer cages can be performed using a radial basis function (RBF) interpolation technique. A set of RBFs (e.g., a function whose output depends on the distance between the input and some fixed point) compute and preserve the distance between the mesh vertices (feature points of the outer cage) and the implicit surface defined by the set of feature points of the inner cage.

Cages may be mathematically represented as a set of points in 3D space with corresponding normalized 2D UV coordinates. Computation may be optimized by solving a system of linear equations which can use heavily vectorized compute structures. Technical benefits may include at least the following:

- The embodiments support the wrapping of clothing onto arbitrary bodies without a shared topology that can be built independently with the cage as reference;
- Distance preservation (e.g., the relative distance between the body vertices and clothing vertices is preserved during the RBF deformation step through the intermediate cages; and
- The embodiments can handle large mesh deformations caused by translations, rotations, and deformation of 3D meshes.

A RBF can be represented by or analogized to a dictionary <key, value> data structure. For example:

Key=1, Value=100
Key=2, Value=200
rbf(1)=100
rbf(2)=200
rbf(1.5)=150

In various implementations, a RBF function with a key-value pair <key, value> has the form of rbf<key, value> for each pair of feature points, wherein key=the inner cage vertex position and value=outer cage vertex position.

As an example, rbf<key, value>=100 is set as the output of the RBF function, and the "100" output is preserved (kept constant) for all RBF functions applied to all pairs of feature points in the inner cage of a next layer and corresponding feature points of the outer cage of an existing layer. Thus, if the vertex position of feature point 1 in the outer cage (of the existing layer) is provided as an input to this RBF function, the value of the corresponding feature point 1 in the inner cage (of the next layer) is computed by the RBF function such that rbf<vertex position of feature point 1 in inner cage, vertex position of corresponding feature point 1 in outer cage>=100. The RBF function (computation) is then performed successively on each outer cage vertex position (feature point) of an existing layer, so that the vertex position of the corresponding feature point of the inner cage (of the next layer) is identified/interpolated from the known vertex position of the existing feature point(s) in the outer cage and such that the RBF function output of "100" is preserved in all of the RBF functions. In this manner, the next layer can be deformed to fit over the existing layer.

Figure 7:
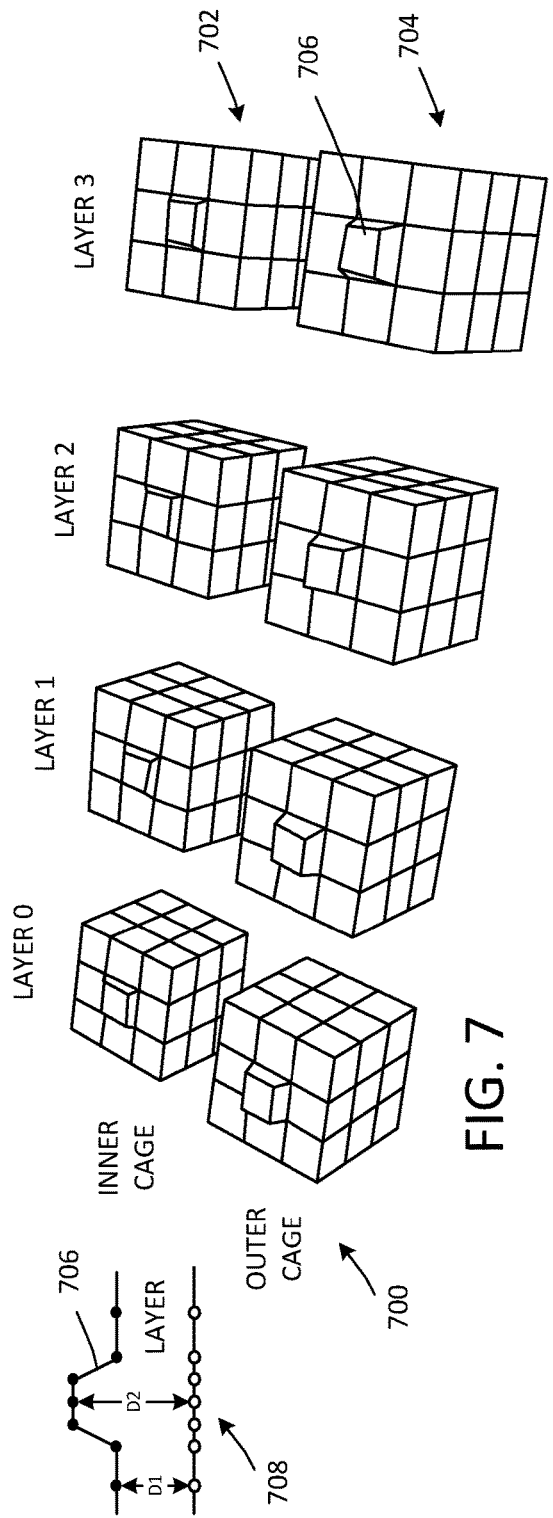
FIG. 7 shows a diagram representing an initial state of layers, in accordance with some implementations.
Figure 8:
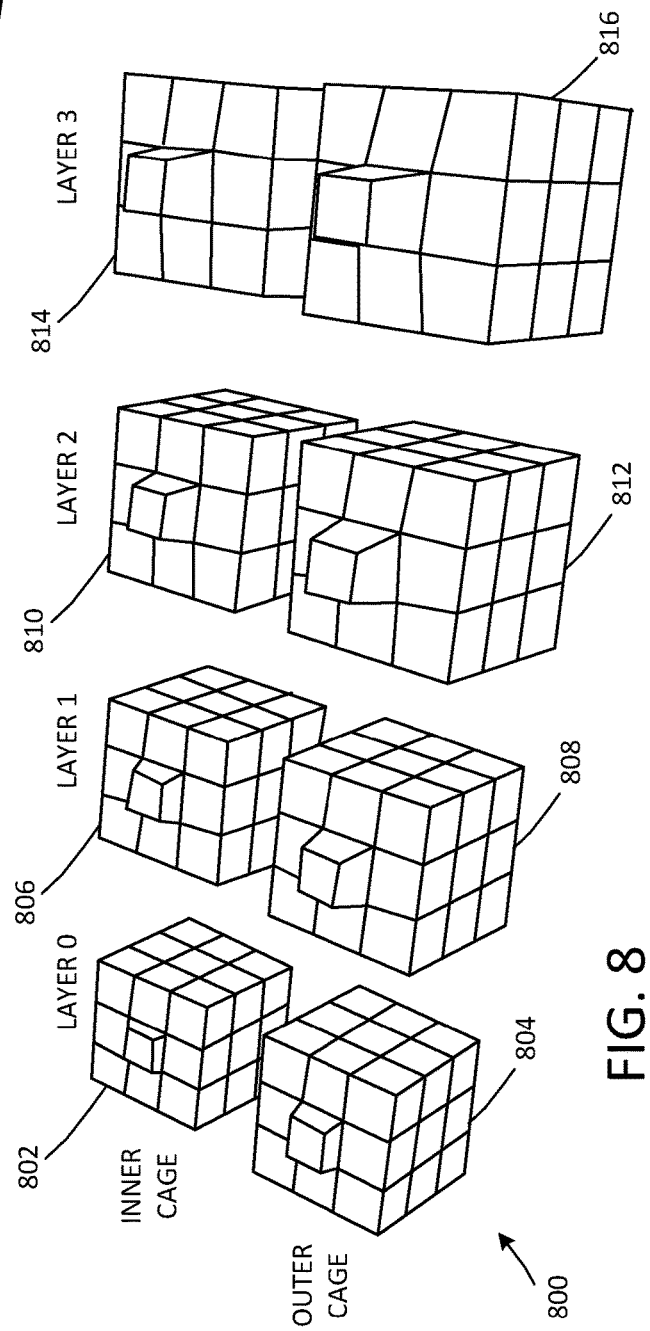
FIG. 8 shows a diagram representing a layer being formed over another layer, in accordance with some implementations.

Further details of an example RBF technique may be ascertained by referring to FIGS. 7 and 8. Beginning first with FIG. 7, FIG. 7 shows a diagram 700 representing an initial state of layers, in accordance with some implementations. The inner cages for the respective four layers (e.g., Layer 0-Layer 3, with Layer 0 being the bottom layer and progressing upward to Layer 3 as the uppermost layer) are shown at 702, while the outer cages for Layer 0-Layer 3 are shown at 704. The bottom Layer 0 may be the body cage or a first layer of clothing to be placed over the body cage. In the initial state of FIG. 7, every layer is the same (e.g., have the same values for vertex positions from one layer to the next layer) in terms of the positions of the vertices (feature points) of the inner cages 702 and outer cages 704. Thus, the positions of the vertices (feature points) in the outer cage of Layer 0 are the same as the positions of the vertices (feature points) in the outer cage of Layer 1 to Layer 3. Analogously, the positions of the vertices (feature points) in the inner cage of Layer 0 are the same as the positions of the vertices (feature points) in the inner cage of Layer 1 to Layer 3.

As shown in the example of FIG. 7, each of the layers (both inner and outer cages) includes a protrusion 706, which is a structure that differs/protrudes from the generally planar surfaces of the layer. In terms of an avatar mannequin, for example, the protrusion 706 may represent the irregular contours of a body shape (e.g., fingers, ears, nose, elbow, horns, etc.). In terms of clothing, the protrusion 706 may represent spikes, buttons, puffy/baggy portions of clothes, etc.

Referring next to a sub-diagram 708 in FIG. 7, a representation of an individual layer is shown. Each layer is defined by a pair of inner/outer cages. The layer in the sub-diagram 708 includes the protrusion 706, along with an outer cage having feature points (vertices) shown as solid dots and an inner cage having feature points (vertices) shown as hollow dots. Each pair of corresponding dots (one each from the inner cage and the outer cage) is represented by a RBF function of the form rbf<key, value>, wherein key=the inner cage vertex position and value=outer cage vertex position. In some layer geometries wherein there may not be a 1-to-1 correspondence between a feature point in the inner cage and a feature point in the outer cage (e.g., one of the feature points is absent or misaligned), RBF interpolation may be used to define the missing feature point (e.g., reconstruct or fill in missing values).

A distance D1 between corresponding dots (outside of the protrusion 706) is the distance between a feature point in the outer cage and a corresponding feature point in the inner cage. The distance D1 can have a value of equal or greater than 0 or more pixels, for instance. A distance D2 is the distance between a feature point in the outer cage and a corresponding feature point in the inner cage, along the protrusion 706. The distance D2 can have a value of one pixel, two pixels or a greater number of pixels, for instance, such that the distance D2 is greater than the distance D1.

As explained throughout this disclosure, the distances D1 and D2 can be preserved as a new layer is conformingly fitted over an existing layer (described next with respect to FIG. 8). In this manner, the visual appearance of surface features of a layer of clothing can be at least partially preserved. For example, a pair of "baggy" pants fitted over an avatar will still appear "baggy" even though the avatar body or underlying clothing layer may have a different shape/contour (slim or otherwise not baggy). As another example, a "spiked jacket" can be fitted over an avatar, and then a scarf can be conformingly fitted over the spiked jacket, so as to provide a visual appearance of a scarf being suspended by the "spikes" of the jacket, rather than following the peaks and valleys of each spike.

Referring next to FIG. 8, FIG. 8 shows a diagram 800 representing a new layer being formed over an existing layer, in accordance with some implementations. As shown in the diagram 800 and as will be explained next, each subsequent (new) layer is more and more inflated to accommodate the previous (existing) layer.

Furthermore, the inner cage for a new layer is equal to the outer cage of the immediately previous (existing) layer. For instance, Layer 0 includes an inner cage 802 and an outer cage 804. Layer 0 may be, for example, a first layer of clothing fitted over an avatar body/mannequin. Alternatively, Layer 0 may be base layer that is used to transform a standard body template to a current avatar body.

Layer 1 (a second layer of clothing fitted over the first Layer 0) includes an inner cage 806 that is deformed (inflated) so as to be equal (e.g., in terms of shape, size, contour, etc.) to the outer cage 804 of previously fitted Layer 0, and an outer cage 808 of Layer 1 is also correspondingly inflated (e.g., so as to preserve the distance(s) between corresponding feature points of the cages 806 and 808).

Layer 2 (a third layer of clothing fitted over the second Layer 1) includes an inner cage 810 that is deformed (inflated) so as to be equal to the outer cage 808 of previously fitted Layer 1, and an outer cage 812 of Layer 2 is also correspondingly inflated. Layer 3 (a fourth layer of clothing fitted over the third Layer 2) includes an inner cage 814 that is deformed (inflated) so as to be equal to the outer cage 812 of previously fitted Layer 2, and an outer cage 816 of Layer 3 is also correspondingly inflated.

The steps for sequential overlaying of the layers as shown in diagram 800 of FIG. 8 may be described as follows:
1. Clothing layer N:
   A. Layer N deforms around the avatar body by matching the avatar body's outer cage and the clothing Layer N's inner cage.
   B. The outer cage of the clothing Layer N is also deformed to now envelope the combined body with clothing.
2. Clothing layer N+1:
   A. Clothing layer N+1 deforms around the body+clothing layer N by matching the new outer cage from step 1B and the inner cage of the clothing layer N+1.
   B. The outer cage of the combined body and the above two layers of clothing is computed by deforming the outer cage of clothing layer N+1 to envelope the combined geometry of the body+two layers of clothing.
3. Continue the same approach as above for as many clothing layers N+2 etc. as to be worn by the avatar.

Thus, according to the foregoing, every layer defines a rule (using RBF interpolation) as to how get from the current layer to the next layer. In the example of FIG. 8, RBF interpolations are chained together in sequence to get from any level to any other level in an upward layering direction (which in the case of an avatar cage being draped with layers of clothing may correspond to an outward direction, starting from the mannequin). In some implementations, the RBF interpolations can be chained in the opposite direction to get from an upper layer to a lower layer (e.g., to provide suitable deformations for items such as armor plating that compresses the layers beneath the armor plating, rather than expanding and fitting over a puffy jacket).

FIG. 9 shows a diagram 900 that represents logical hierarchical layering of objects, such as clothing, over an avatar body 902, in accordance with some implementations. The symbolic separations between different layers are depicted in FIG. 9 by the dashed lines, with a lowest (base) layer being at the bottom of the diagram 900 and the uppermost layer being at the top of the diagram 900. The order/sequence in which clothing layers and other graphical objects are placed on the avatar body 902 may be based on a logical arrangement. For instance, socks may be defined as items that are to be placed directly over a foot, and that are placed in a layer before shoes (which may be placed over the socks).

In the example shown in the diagram 900, the avatar body 902 forms the base (first level) graphical object. Over this base graphical object, the second level of graphical objects may be placed, such as socks 904, hand accessories (e.g., a ring) 906, makeup 908, etc.

After the second level, subsequent levels of graphical objects in the hierarchy may follow in sequence, such as clothing (inner wear) 910, shoes 912, clothing (outer wear) 914, accessories 916 (e.g., for neck like scarves; piercings for ear, nose, brow; etc.), hair 918, and accessories 920 (e.g., front/back/shoulder accessories, hat, etc.).

It is to be appreciated that the graphical objects and sequence of the various levels of graphical objects depicted in FIG. 9 are merely examples. Other implementations can include different/fewer/additional graphical objects than those depicted in FIG. 9, and such graphical objects may be arranged in different levels and in a sequence (or out of sequence) relative to what is depicted in FIG. 9.

Figure 10:
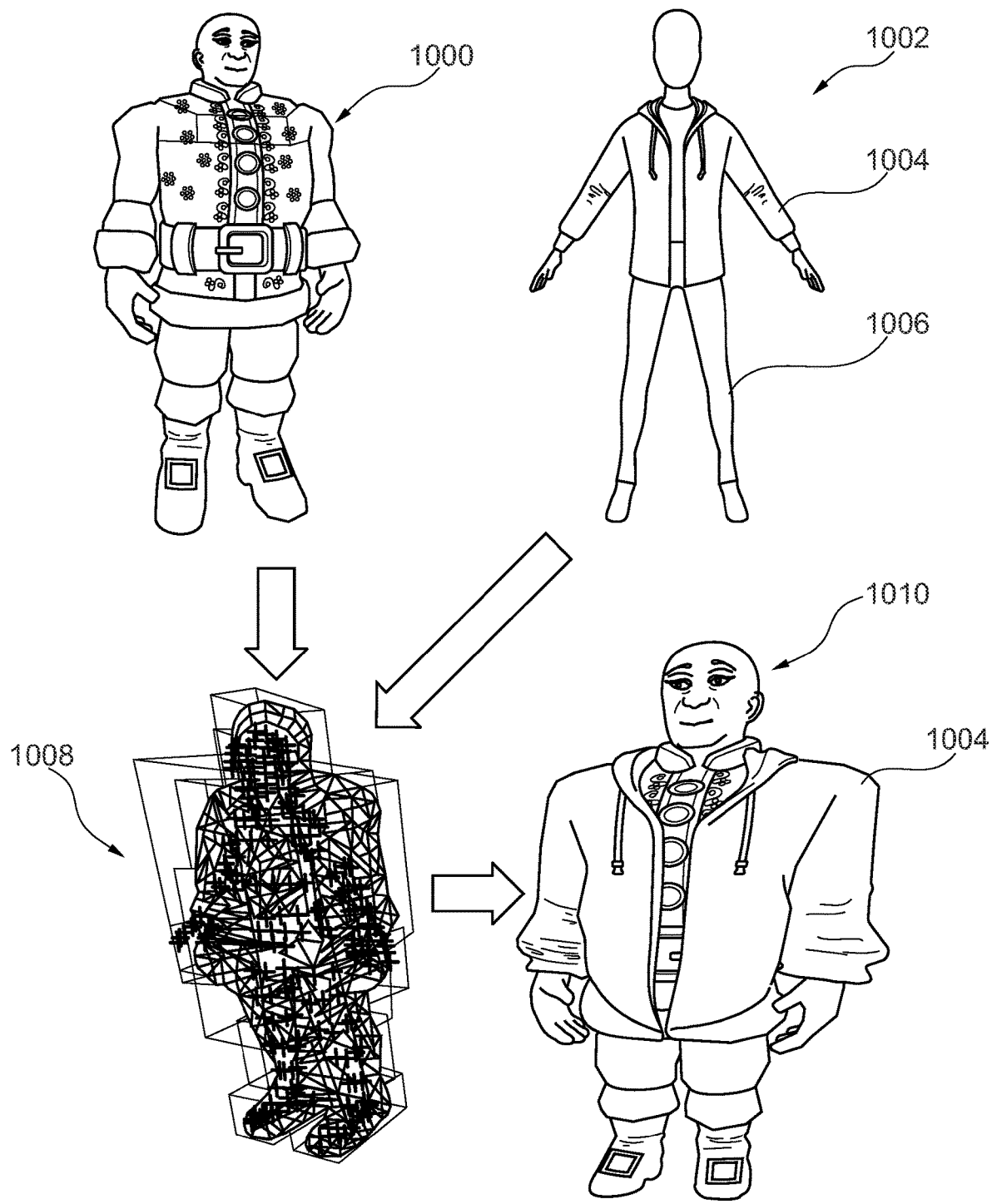
FIG. 10 shows an example of clothing layers being deformed over an avatar body, in accordance with some implementations.

FIG. 10 shows an example of clothing being deformed over an avatar body, in accordance with some implementations. FIG. 10 can be reviewed in conjunction with FIGS. 7-9 and their accompanying description above.

Beginning first at 1000, a user has selected an avatar body having a generally stocky build. The avatar body may be selected from, for example, a library of avatars provided by avatar creators. Also at 1000, the user has used one or more tools (described later below with respect to FIGS. 11 and 13) to select and fit a first layer of clothing over the avatar body, such that the shoes, pants, belt, and coat of the first layer of clothing are deformed to conform to the stocky build of the avatar body. These clothing items in the first layer of clothing may be selected from, for example, a library of clothing items provided by clothing creators.

It is noted that at 1000, one or more of the clothing items shown on the avatar body could alternatively be skins provided for the avatar by the avatar creator, rather than clothing items that are fitted/deformed over the avatar body using the techniques described herein.

Next at 1002, a jacket 1004, draped on a generic mannequin 1006, is available for selection from the library of clothing. The jacket 1004 at 1002 can be a generic template of a jacket (which is shown as being worn over the generic mannequin 1006). The jacket 1004 at 1002 may be formed by graphical meshes. The jacket 1004 at 1002 may have inner/outer cages already configured for it while in the library of clothing, or the inner/outer cages may be computed later at runtime after the user has selected the jacket from the library of clothing. The jacket may be selected by the user, for example, as another piece of clothing to layer on top of the clothing shown at 1000.

Next at 1008, the steps described above are performed, including: mapping the inner cage of the jacket 1004 from 1002 to the outer cage of the clothing from 1000 so as to envelope the jacket over the previous clothing from 1000, and deforming the outer cage of the jacket 1004 from 1002 so as to preserve the vertex distances between the outer cage and the inner cage of the jacket 1004.

The result of the deformation(s) at 1008 is shown at 1010. At 1010, the jacket 1004 from 1002 has been deformed so as to fit the stocky avatar plus previous clothing layer (from 1000). For instance, the size of the jacket 1004 has been scaled upwards to match the size of the avatar plus the previous/underlying clothing layer, and the shape of the jacket 1004 has been conformed (e.g., inflated) to the shape of the avatar plus the previous/underlying clothing. Further, the jacket 1004 has maintained the visual appearance of its various contours/features (e.g., hood, cuffs, etc.), as a result of preserving the distance between the feature points in the inner/outer cages. As can be seen, portions of the clothing as shown in 1000 are visible underneath the jacket (e.g., the circle-shaped items seen in a straight line starting at the neck and going down the torso).

Figure 11:
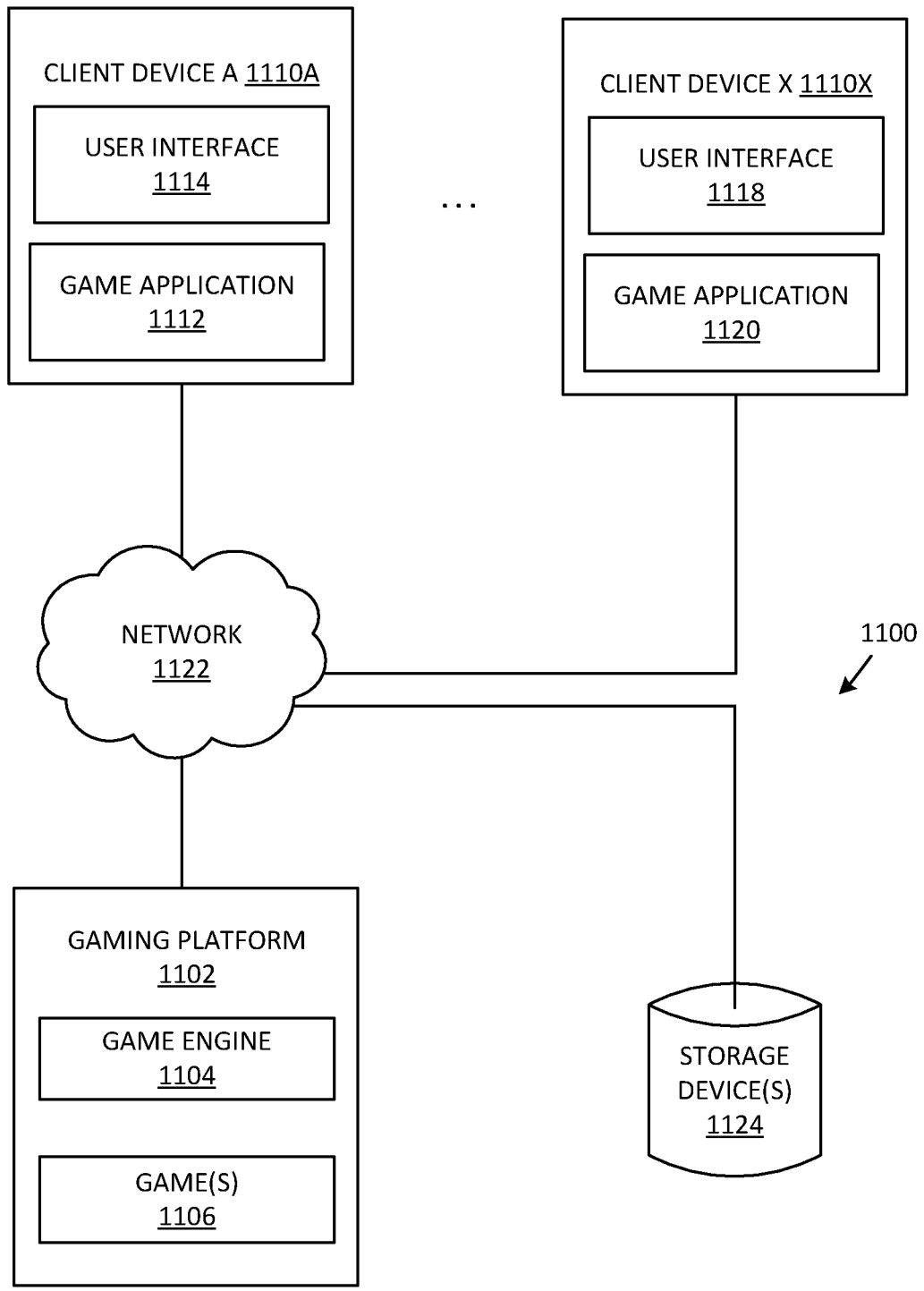
FIG. 11 is a diagram of an example system architecture that includes a 3D environment platform that can support 3D avatars with layered clothing, in accordance with some implementations.

FIG. 11 is a diagram of an example system architecture 1100 that includes a 3D environment platform that can support 3D avatars with layered clothing, in accordance with some implementations. In the example of FIG. 11, the 3D environment platform will be described in the context of a gaming platform 1102 purely for purposes of explanation, and various other implementations can provide other types of 3D environment platforms, such as online meeting platforms, virtual reality (VR) or augmented reality (AR) platforms, or other types of platforms that can provide 3D content. The description provided herein for the gaming platform 1102 and other elements of the system architecture 1100 can be adapted to be operable with such other types of 3D environment platforms.

Online gaming platforms (also referred to as "user-generated content platforms" or "user-generated content systems") offer a variety of ways for users to interact with one another, such as while the users are playing an electronic game. For example, users of an online gaming platform may work together towards a common goal, share various virtual gaming items, send electronic messages to one another, and so forth. Users of an online gaming platform may play games using characters, such as the 3D avatars having layered clothing as described above, which the users can navigate through a 3D world rendered in the electronic game.

An online gaming platform may also allow users of the platform to create and animate avatars, as well as allowing the users to create other graphical objects to place in the 3D world. For example, users of the online gaming platform may be allowed to create, design, and customize the avatar, and to create, design, and fit various clothing items onto the avatar.

In FIG. 11, the example system architecture 1100 (also referred to as "system" herein) includes the online gaming platform 1102, a first client device 1110A and at least one second client device X 1110X (generally referred to as "client device(s) 1110" herein). The online gaming platform 1102 can include, among other things, a game engine 1104 and one or more electronic games 1106. The system architecture 1100 is provided for illustration of one possible implementation. In other implementations, the system architecture 1100 may include the same, fewer, more, or different elements configured in the same or different manner as that shown in FIG. 11.

A communication network 1122 may be used for communication between the online gaming platform 1102 and the client devices 1110, and/or between other elements in the system architecture 1100. The network 1122 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long term evolution (LTE) network), routers, hubs, switches, server computers, or a combination thereof.

The client device 1110A can include a game application 1112 and one or more user interfaces 1114 (e.g., audio/video input/output devices). Similarly, the client device X 1100X can include a game application 1120 and user interfaces 1118 (e.g., audio/video input/output devices). The audio/video input/output devices can include one or more of a microphone, speakers, headphones, display device, camera, etc.

The system architecture 1100 may further include one or more storage devices 1124. The storage device 1124 may be, for example, a storage device located within the online gaming platform 1102 or communicatively coupled to the online gaming platform 1102 via the network 1122 (such as depicted in FIG. 11). The storage devices 1124 may store, for example, graphical objects that are rendered in the game 1106 by the game engine 1104 or by the game applications 1112/1120, as well as the configuration/properties information of the graphical objects (such as coordinate information of feature points, size dimensions, etc. that are usable for generating cages and for deformation such as described above).

In some embodiments, the storage devices 1124 can be part of one or more separate content delivery networks that provide the graphical objects rendered in the game 1106. For instance, an avatar creator can publish avatar templates in library accessible at a first storage device, and a clothing creator can (separately and independently from the avatar creator) publish clothing templates in a library accessible at a second storage device. Then, the game application 1112 may pull (or have pushed to it) graphical objects (avatars and clothing items) stored in the first/second storage devices, for computation/compilation/deformation at runtime for presentation during the course of playing the game.

In one implementation, the storage device 1124 may be a non-transitory computer readable memory (e.g., random access memory), a cache, a drive (e.g., a hard drive), a flash drive, a database system, or another type of component or device capable of storing data and other content. The storage device 1124 may also include multiple storage components (e.g., multiple drives or multiple databases) that may also span multiple computing devices (e.g., multiple server computers).

In some implementations, the online gaming platform 1102 can include a server having one or more computing devices (e.g., a cloud computing system, a rackmount server, a server computer, cluster of physical servers, etc.). In some implementations, a server may be included in the online gaming platform 1102, be an independent system, or be part of another system or platform.

In some implementations, the online gaming platform 1102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 1102 and to provide a user with access to online gaming platform 1102. The online gaming platform 1102 may also include a website (e.g., a webpage) or application back-end software that may be used to provide a user with access to content provided by online gaming platform 1102. For example, a user may access online gaming platform 1102 using the game application 1112 on the client device 1110.

In some implementations, online gaming platform 1102 may be a type of social network providing connections between users or a type of user-generated content system that allows users (e.g., end-users or consumers) to communicate with other users on the online gaming platform 1102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 1102 may be a virtual gaming platform. For example, the gaming platform may provide single-player or multiplayer games to a community of users that may access or interact with games using client devices 1110 via the network 1122. In some implementations, games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., the client device 1110) within a game (e.g., the game 1106) or the presentation of the interaction on a display or other user interfaces (e.g., the user interface 1114/1118) of a client device 1110.

In some implementations, the game 1106 can include an electronic file that can be executed or loaded using software, firmware or hardware configured to present the game content (e.g., digital media item) to an entity. In some implementations, the game application 1112 may be executed and the game 1106 rendered in connection with the game engine 1104. In some implementations, the game 1106 may have a common set of rules or common goal, and the environments of a game 1106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a 3D environment. The one or more environments of the game 1106 may be collectively referred to a "world" or "gaming world" or "virtual world" or "universe" herein. For example, a user may build a virtual environment that is linked to another virtual environment created by another user. A character of the virtual game (such as a 3D avatar having layered clothing as described herein) may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online gaming platform 1102 can host one or more games 1106 and can permit users to interact with the games 1106 using the game application 1112 of the client device 1110. Users of the online gaming platform 1102 may play, create, interact with, or build games 1106, communicate with other users, and/or create and build objects (e.g., also referred to as "item(s)" or "game objects" or "virtual game item(s)" or "graphical objects" herein) of games 1106. For example, in generating user-generated virtual items, users may create characters, animation for the characters, decoration (e.g., clothing, skins, accessories, etc.) for the characters, one or more virtual environments for an interactive game, or build structures used in the game 1106, among others. In some implementations, users may buy, sell, or trade game virtual game objects, such as in-platform currency (e.g., virtual currency), with other users of the online gaming platform 1102.

In some implementations, online gaming platform 1102 may transmit game content to game applications (e.g., the game application 1112). In some implementations, game content (also referred to as "content" herein) may refer to any data or software instructions (e.g., game objects, game, user information, video, images, commands, media item, etc.) associated with online gaming platform 1102 or game applications. In some implementations, game objects (e.g., also referred to as "item(s)" or "objects" or "virtual game item(s)" herein) may refer to objects that are used, created, shared, or otherwise depicted in the game 1106 of the online gaming platform 1102 or game applications 1112 or 1120 of the client devices 1110. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the online gaming platform 1102 hosting games 1106, is provided for purposes of illustration. In some implementations, online gaming platform 1102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, the game 1106 may be associated with a particular user or a particular group of users (e.g., a private game), or made widely available to users of the online gaming platform 1102 (e.g., a public game). In some implementations, where online gaming platform 1102 associates one or more games 1106 with a specific user or group of users, online gaming platform 1102 may associate the specific user(s) with a game 1102 using user account information (e.g., a user account identifier such as username and password).

In some implementations, online gaming platform 1102 or client devices 1110 may include the game engine 1104 or game application 1112/1120. In some implementations, game engine 1104 may be used for the development or execution of games 1106. For example, game engine 1106 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 1104 may generate commands that help compute and render the game (e.g., rendering commands, collision commands, animation commands, physics commands, etc.), including commands to select an avatar, customize the avatar, select clothing items, deform the clothing items as layers on the avatar, and various other operations described herein. In some implementations, game applications 1112/1118 of client devices 1110 may work independently, in collaboration with game engine 1104 of online gaming platform 1102, or a combination of both, in order to perform the operations described herein related to deforming and rendering layered clothing at runtime.

In some implementations, both the online gaming platform 1102 and client devices 1110 execute a game engine or a game application (1104, 1112, 1120, respectively). The online gaming platform 1102 using game engine 1104 may perform some or all the game engine functions (e.g., generate physics commands, animation commands, rendering commands, etc., including deformation of clothing layers as described above), or offload some or all the game engine functions to the game application 1112 of client device 1110. In some implementations, each game 1106 may have a different ratio between the game engine functions that are performed on the online gaming platform 1102 and the game engine functions that are performed on the client devices 1110.

For example, the game engine 1104 of the online gaming platform 1102 may be used to generate physics commands in cases where there is a collision between at least two game objects, while the additional game engine functionality (e.g., generate rendering commands, including deforming and displaying layered clothing) may be offloaded to the client device 1110. In some implementations, the ratio of game engine functions performed on the online gaming platform 1102 and client device 1110 may be changed (e.g., dynamically) based on gameplay conditions. For example, if the number of users participating in gameplay of a particular game 1106 exceeds a threshold number, the online gaming platform 1102 may perform one or more game engine functions that were previously performed by the client devices 1110.

For example, users may be playing a game 1106 on client devices 1110, and may send control instructions (e.g., user inputs, such as right, left, up, down, user election, or character position and velocity information, etc.) to the online gaming platform 1102. Subsequent to receiving control instructions from the client devices 1110, the online gaming platform 1102 may send gameplay instructions (e.g., position and velocity information of the characters participating in the group gameplay or commands, such as rendering commands, collision commands, etc.) to the client devices 1110 based on control instructions. For instance, the online gaming platform 1102 may perform one or more logical operations (e.g., using game engine 1104) on the control instructions to generate gameplay instruction for the client devices 1110. In other instances, online gaming platform 1102 may pass one or more or the control instructions from one client device 1110 to other client devices participating in the game 1106. The client devices 1110 may use the gameplay instructions and render the gameplay for presentation on the displays of client devices 1110, including the avatars with layered clothing described above.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 1102. In other implementations, the control instructions may be sent from the client device 1110 to another client device, where the other client device generates gameplay instructions using the local game engine application 1120. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow the client device 1110 to render gameplay of a game, such as a multiplayer game. The gameplay instructions may include one or more of user input (e.g., control instructions), character position and velocity information, or commands (e.g., physics commands, animation commands, rendering commands, collision commands, etc.).

In some implementations, the client device(s) 1110 may each include computing devices such as personal computers (PCs), mobile devices (e.g., laptops, mobile phones, smart phones, tablet computers, or netbook computers), network-connected televisions, gaming consoles, etc. In some implementations, a client device 1110 may also be referred to as a "user device." In some implementations, one or more client devices 1110 may connect to the online gaming platform 1102 at any given moment. It may be noted that the number of client devices 1110 is provided as illustration, rather than limitation. In some implementations, any number of client devices 1110 may be used.

In some implementations, each client device 1110 may include an instance of the game application 1112 or 1120. In one implementation, the game application 1112 or 1120 may permit users to use and interact with online gaming platform 1102, such as control a virtual character in a virtual game hosted by online gaming platform 1102, or view or upload content, such as games 1106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 1110 and allows users to interact with online gaming platform 1102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 1112/1120 may be an online gaming platform application for users to build, create, edit, upload content to the online gaming platform 1102 as well as interact with online gaming platform 1102 (e.g., play games 1106 hosted by online gaming platform 1102). As such, the game application 1112/1120 may be provided to the client device 1110 by the online gaming platform 1102. In another example, the game application may be an application that is downloaded from a server.

In some implementations, a user may login to online gaming platform 1102 via the game application. The user may access a user account by providing user account information (e.g., username and password) where the user account is associated with one or more characters available to participate in one or more games 1106 of online gaming platform 1102.

In general, functions described in one implementation as being performed by the online gaming platform 1102 can also be performed by the client device(s) 1110, or a server, in other implementations if appropriate. In addition, the functionality attributed to a particular component can be performed by different or multiple components operating together. The online gaming platform 1102 can also be accessed as a service provided to other systems or devices through appropriate application programming interfaces (APIs), and thus is not limited to use in websites.

Figure 12:
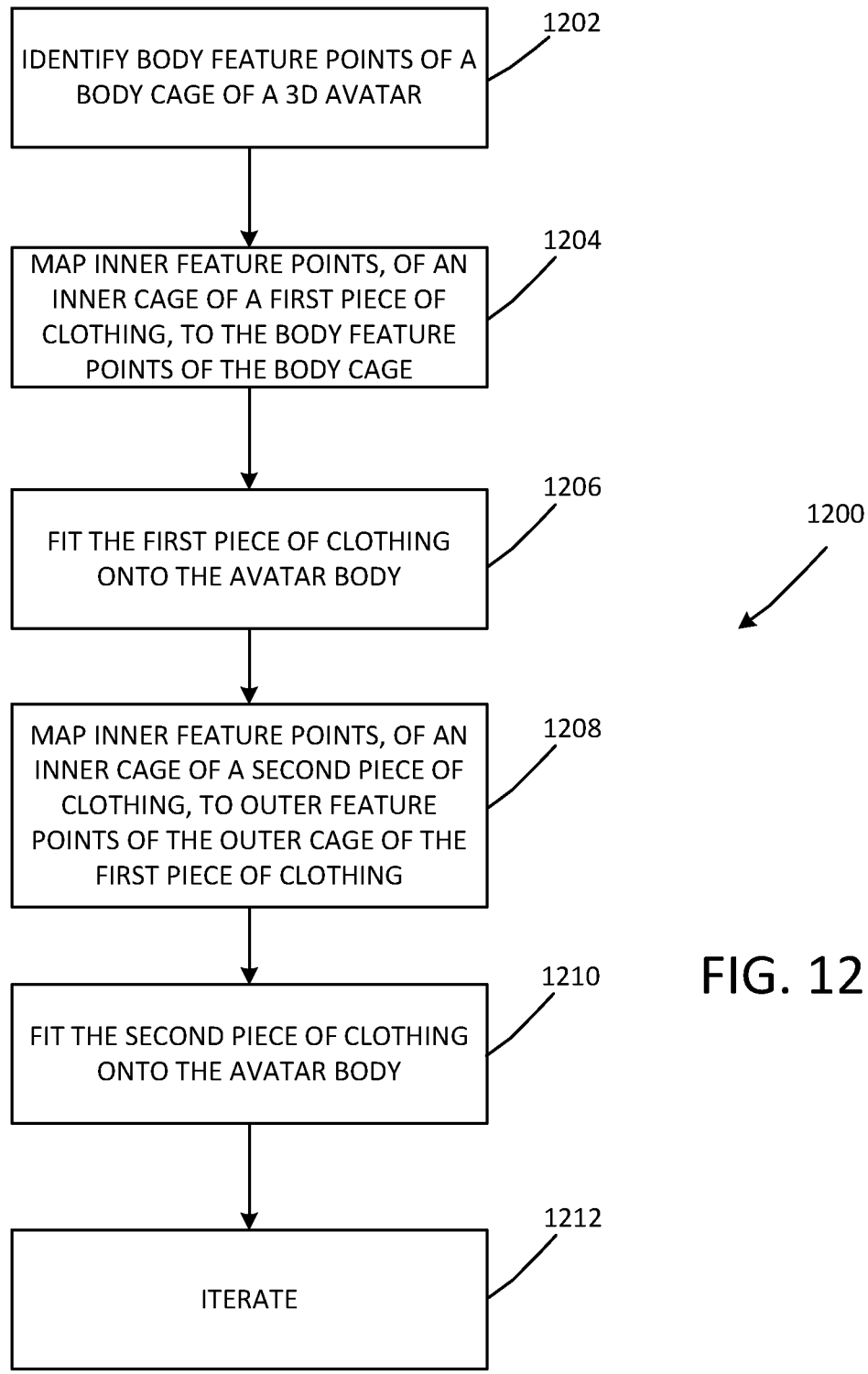
FIG. 12 is a flowchart illustrating a computer-implemented method to provide layered clothing on a 3D avatar, in accordance with some implementations.

FIG. 12 is a flowchart illustrating a computer-implemented method 1200 to provide layered clothing on a 3D avatar, in accordance with some implementations. For the sake of simplicity, the various operations in the method 1200 are described in the context of the game application 1112 at the client device 1110 performing the operations. However, and as previously described above with respect to FIG. 11, some of the operations may be performed alternatively or additionally, in whole or in part, by the game engine 1104 at the gaming platform 1102. The example method 1200 may include one or more operations illustrated by one or more blocks, such as blocks 1202 to 1212. The various blocks of the method 1200 and/or of any other process(es) described herein may be combined into fewer blocks, divided into additional blocks, supplemented with further blocks, and/or eliminated based upon the desired implementation.

The method 1200 of FIG. 12 is explained herein with reference to the elements shown in FIGS. 1-11. In one embodiment, the operations of the method 1200 may be performed in a pipelined sequential manner. In other embodiments, some operations may be performed out-of-order, in parallel, etc.

At a block 1202 ("identify body feature points of a body cage of a 3D avataR"), the user has launched the game application 1112 and has accessed a library of avatar bodies to select an avatar to use in a 3D environment (such as an online game). The selected avatar may be a generic template with a general shape/size or may be a more detailed avatar template of a specific type (e.g., humanoid, alien, animal, etc.) with skinning. The avatar selected from the library may already have a body cage (see, e.g., FIGS. 1-3) configured thereon, and/or the game application 1112 may generate at least some of the body cage at runtime. The game application identifies the feature points of the body cage, which define the shape of the avatar. The block 1202 may be followed by a block 1204.

At the block 1204 ("Map inner feature points, of an inner cage of a first piece of clothing, to the body feature points of the body cage"), user has accessed a library of clothing items and has selected a first piece of clothing. As with the avatar body at the block 1202, the first piece of clothing in the library may have cage(s) configured thereon, and/or the game application 1112 may generate at least some of the cage(s) at runtime. Such cages for the first piece of clothing include an inner cage and an outer cage (see, e.g., FIGS. 7 and 8). At the block 1204, the game application 1112 may utilize a RBF technique to map the inner feature points, of the inner cage of the first piece of clothing, to the body feature points of the body cage, so as to deform the first piece of clothing to conform to the avatar body. The block 1204 may be followed by a block 1206.

At the block 1206 ("fit the first piece of clothing onto the avatar body"), the game application 1112 fits the first piece of clothing onto the avatar body. This fitting may be performed by the game application 1112 at the block 1206 by at least partially enveloping the avatar body with the deformed first piece of clothing. For instance, the coordinate positions of at least some of the inner feature points (of the inner cage of the first piece of clothing) assume the values of the coordinate positions of the body feature points of the body cage. The block 1206 may be followed by the block 1208.

At the block 1208 ("map inner feature points, of an inner cage of a second piece of clothing, to OUTER FEATURE POINTS OF the outer cage of the first piece of clothing"), the user selects a second piece of clothing from the library. Like the first piece of clothing at the block 1204, the second piece of clothing at the block 1208 has inner and outer cages. The game application 1112 maps the inner feature points (of the inner cage of the second piece of clothing) to the outer feature points of the outer cage of the deformed first piece of clothing that is already fitted onto the avatar body, so as to deform the second piece of clothing to conform to the avatar body having the first piece of clothing fitted thereon. The block 1208 may be followed by a block 1210.

At the block 1210 ("fit the second piece of clothing onto the avatar body"), the game application 1112 fits the second piece of clothing onto the avatar body (which has the first piece of clothing already fitted thereon). This fitting may be performed by the game application 1112 at the block 1210 by at least partially enveloping the avatar body (having the first piece of clothing already fitted thereon) with the deformed second piece of clothing. For instance, the coordinate positions of at least some of the inner feature points (of the inner cage of the second piece of clothing) assume the values of the coordinate positions of the outer feature points of the outer cage of the deformed first piece of clothing. The block 1210 may be followed by the block 1212.

At the block 1212 ("ITERATE"), the operations analogous to those described above may be performed, so as to layer and deform additional piece(s) of clothing over the existing layer(s). For example, in a first iteration as described above with respect to blocks 1202-1210, a first clothing item is fitted over a body cage. In a second iteration that may be performed at the block 1212, an additional clothing item may be fitted over the first clothing item which is draped over the body cage. Iterations can be performed to fit additional clothing items for any number of items. In some implementations (e.g., when clothing items in consecutive fittings relate to different, non-overlapping portions of the outer cage at that stage), fitting may be performed in parallel (e.g., fitting of hats may be performed concurrently with fitting of shoes, fitting of a shirt may be performed concurrently with fitting of pants, fitting of socks may be performed concurrently with fitting of gloves, etc.).

Figure 13:
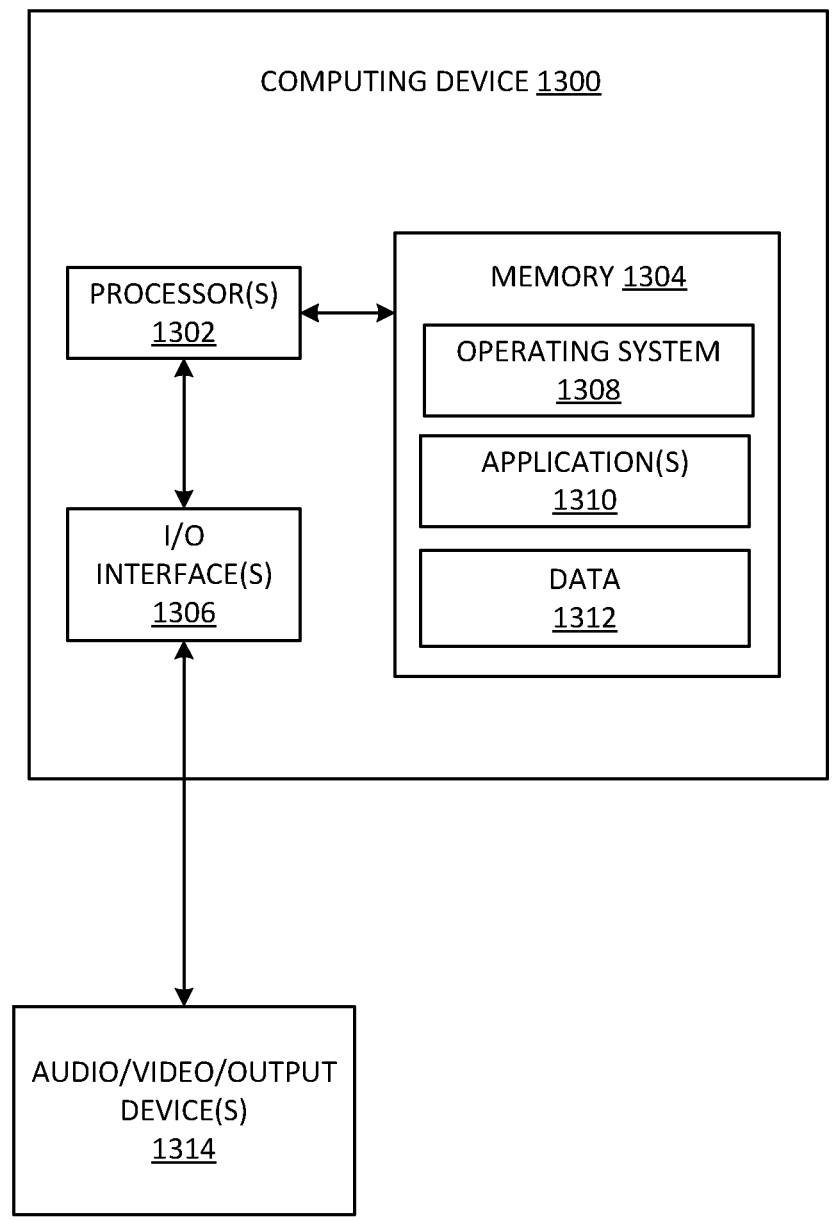
FIG. 13 is a block diagram illustrating an example computing device, in accordance with some implementations.

FIG. 13 is a block diagram of an example computing device 1300 which may be used to implement one or more features described herein. The client devices 1110 and/or the gaming platform 1102 of FIG. 11 may be provided in the form of the computing device 1300 of FIG. 13. In one example, the computing device 1300 may be used to perform the methods described herein. The computing device 1300 can be any suitable computer system, server, or other electronic or hardware device. For example, the computing device 1300 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, the computing device 1300 includes a processor 1302, a memory 1306, an input/output (I/O) interface 1306, and audio/video input/output devices 1314.

The processor 1302 can be one or more processors and/or processing circuits to execute program code and control basic operations of the computing device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

The memory 1304 may be provided in the computing device 1300 for access by the processor 1302, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 1302 and/or integrated therewith. The memory 1304 can store software executable on the computing device 1300 by the processor 1302, including an operating system 1308, one or more applications 1310 and its related data 1312. The application 1310 is an example of a tool that can be used to embody the game applications 1112/1120 or the game engine 1104. In some implementations, the application 1310 can include instructions that, in response to execution by the processor 1302, enable the processor 1302 to perform or control performance of the operations described herein with respect to deforming/fitting layered clothing over an avatar body.

Any of software in the memory 1304 can alternatively be stored on any other suitable storage location or computer-readable medium. In addition, memory 1304 (and/or other connected storage device(s)) can store instructions and data used in the features described herein. The memory 1304 and any other type of storage (magnetic disk, optical disk, magnetic tape, or other tangible media) can be considered "storage" or "storage devices."

The I/O interface 1306 can provide functions to enable interfacing the computing device 1300 with other systems and devices. For example, network communication devices, storage devices, and input/output devices can communicate with the computing device 1300 via an I/O interface 1306. In some implementations, the I/O interface 1306 can connect to interface devices including input devices (keyboard, pointing device, touchscreen, microphone, camera, scanner, etc.) and/or output devices (display device, speaker devices, printer, motor, etc.), which are collectively shown as at least one audio/video input/output device 1314.

The audio/video input/output devices 1314 can include an audio input device (e.g., a microphone, etc.) that can be used to receive audio messages as input, an audio output device (e.g., speakers, headphones, etc.) and/or a display device, that can be used to provide graphical and visual output such as the example rendered 3D avatars with layered clothing described above.

For ease of illustration, FIG. 13 shows one block for each of processor 1302, memory 1304, I/O interface 1306, the application 1310, etc. These blocks may represent one or more processors or processing circuitries, operating systems, memories, I/O interfaces, applications, and/or software modules. In other implementations, the computing device 1300 may not have all of the components shown and/or may have other elements including other types of elements instead of, or in addition to, those shown herein.

A user device can also implement and/or be used with features described herein. Example user devices can be computer devices including some similar components as the computing device 1300, e.g., processor(s) 1302, memory 1304, and I/O interface 1306. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 1314, for example, can be connected to (or included in) the computing device 1300 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the method 1200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide layered clothing on a three-dimensional (3D) avatar, the method comprising:
    identifying a body cage of an avatar body, wherein the body cage includes a plurality of points that envelope the avatar body;
    mapping first inner feature points of a first inner cage of a first piece of clothing to the plurality of points of the body cage to deform the first piece of clothing to fit over the avatar body;
    identifying a first outer cage of the first piece of clothing that is fitted over the avatar body, the first outer cage comprising first outer feature points that envelope the first piece of clothing and that are separated from the first inner cage of the first piece of clothing by at least a first distance;
    mapping second inner feature points of a second inner cage of a second piece of clothing to the first outer feature points of the first outer cage of the first piece of clothing to deform the second piece of clothing to fit over the first piece of clothing;
    after mapping the second inner feature points, identifying a second outer cage of the second piece of clothing, wherein the second outer cage of the second piece of clothing includes second outer feature points that envelope the second piece of clothing and that are separated from the second inner cage of the second piece of clothing by at least a second distance; and
    mapping third inner feature points of a third inner cage of a third piece of clothing to the second outer feature points of the second outer cage of the second piece of clothing to deform the third piece of clothing to fit over the second piece of clothing.

2. The method of claim 1, wherein:
    mapping the second inner feature points of the second inner cage of the second piece of clothing to the first outer feature points of the first outer cage of the first piece of clothing maps the second inner cage of the second piece of clothing to the first outer cage of the first piece of clothing.

3. The method of claim 2, wherein:
    the second distance spans between a point in the second outer feature points of the second outer cage of the second piece of clothing and a corresponding point in the second inner feature points of the second inner cage of the second piece of clothing.

4. The method of claim 2, wherein:
    mapping the second inner feature points of the second inner cage of the second piece of clothing to the first outer feature points of the first outer cage of the first piece of clothing comprises a n:1 or 1:n mapping of the second inner feature points to the first outer feature points, and
    n is an integer greater than or equal to 1.

5. The method of claim 1, further comprising:
    maintaining the first distance between at least one of the first inner feature points of the first inner cage and a corresponding first outer feature point of the first outer feature points of the first outer cage such that a visual appearance of a protrusion surface feature of an outer surface of the first piece of clothing is at least partially preserved when the first piece of clothing is deformed.

6. The method of claim 1, wherein the second distance is one of a plurality of distinct distances that separate the second outer feature points of the second outer cage of the second piece of clothing from the second inner cage of the second piece of clothing.

7. The method of claim 1, wherein the first outer cage of the first piece of clothing envelopes a mesh of the first piece of clothing, and wherein the second outer cage of the second piece of clothing envelopes a mesh of the second piece of clothing.

8. A non-transitory computer-readable medium having instructions stored thereon that, responsive to execution by a processor, cause the processor to perform or control performance of operations that comprise:
    identifying a body cage of an avatar body, wherein the body cage includes a plurality of points that envelope the avatar body;
    mapping first inner feature points of a first inner cage of a first piece of clothing to the plurality of points of the body cage to deform the first piece of clothing to fit over the avatar body;
    identifying a first outer cage of the first piece of clothing that is fitted over the avatar body, the first outer cage comprising first outer feature points that envelope the first piece of clothing and that are separated from the first inner cage of the first piece of clothing by at least a first distance;
    mapping second inner feature points of a second inner cage of a second piece of clothing to the first outer feature points of the first outer cage of the first piece of clothing to deform the second piece of clothing to fit over the first piece of clothing;
    after mapping the second inner feature points, identifying a second outer cage of the second piece of clothing, wherein the second outer cage of the second piece of clothing includes second outer feature points that envelope the second piece of clothing and that are separated from the second inner cage of the second piece of clothing by at least a second distance; and mapping third inner feature points of a third inner cage of a third piece of clothing to the second outer feature points of the second outer cage of the second piece of clothing to deform the third piece of clothing to fit over the second piece of clothing.

9. The non-transitory computer-readable medium of claim 8, wherein:

mapping the second inner feature points of the second inner cage of the second piece of clothing to the first outer feature points of the first outer cage of the first piece of clothing maps the second inner cage of the second piece of clothing to the first outer cage of the first piece of clothing.

10. The non-transitory computer-readable medium of claim 9, wherein:

the second distance spans between a point in the second outer feature points of the second outer cage of the second piece of clothing and a corresponding point in the second inner feature points of the second inner cage of the second piece of clothing.

11. The non-transitory computer-readable medium of claim 9, wherein:

mapping the second inner feature points of the second inner cage of the second piece of clothing to the first outer feature points of the first outer cage of the first piece of clothing includes a n:1 or 1:n mapping of the second inner feature points to the first outer feature points, and n is an integer greater than or equal to 1.

12. The non-transitory computer-readable medium of claim 8, wherein the operations further comprise:

maintaining the first distance between at least one of the first inner feature points of the first inner cage and a corresponding first outer feature point of the first outer feature points of the first outer cage such that a visual appearance of a protrusion surface feature of an outer surface of the first piece of clothing is at least partially preserved when the first piece of clothing is deformed.

13. The non-transitory computer-readable medium of claim 8, wherein the second distance is one of a plurality of distinct distances that separate the second outer feature points of the second outer cage of the second piece of clothing from the second inner cage of the second piece of clothing.

14. The non-transitory computer-readable medium of claim 8, wherein the first outer cage of the first piece of clothing envelopes a mesh of the first piece of clothing, and wherein the second outer cage of the second piece of clothing envelopes a mesh of the second piece of clothing.

15. An apparatus, comprising:

a memory having instructions stored therein; and a processor coupled to the memory, and operable to execute the instructions to cause the processor to perform or control performance of operations that include:

identify a body cage of an avatar body, wherein the body cage includes a plurality of points that envelope the avatar body;

map first inner feature points of a first inner cage of a first piece of clothing to the plurality of points of the body cage to deform the first piece of clothing to fit over the avatar body;

identify a first outer cage of the first piece of clothing that is fitted over the avatar body, the first outer cage comprising first outer feature points that envelope the first piece of clothing and that are separated from the first inner cage of the first piece of clothing by at least a first distance;

map second inner feature points of a second inner cage of a second piece of clothing to the first outer feature points of the first outer cage of the first piece of clothing to deform the second piece of clothing to fit over the first piece of clothing;

after mapping the second inner feature points, identifying a second outer cage of the second piece of clothing, wherein the second outer cage of the second piece of clothing includes a second outer feature points that envelope the second piece of clothing and that are separated from the second inner cage of the second piece of clothing by at least a second distance; and map third inner feature points of a third inner cage of a third piece of clothing to the second outer feature points of the second outer cage of the second piece of clothing to deform the third piece of clothing to fit over the second piece of clothing.

16. The apparatus of claim 15, wherein:

the operation to map the second inner feature points of the second inner cage of the second piece of clothing to the first outer feature points of the first outer cage of the first piece of clothing maps the second inner cage of the second piece of clothing to the first outer cage of the first piece of clothing.

17. The apparatus of claim 16, wherein:

the second distance spans between a point in the second outer feature points of the second outer cage of the second piece of clothing and a corresponding point in the second inner feature points of the second inner cage of the second piece of clothing.

18. The apparatus of claim 15, wherein the operations further comprise:

maintain the first distance between at least one of the first inner feature points of the first inner cage and a corresponding first outer feature point of the first outer feature points of the first outer cage such that a visual appearance of a protrusion surface feature of an outer surface of the first piece of clothing is at least partially preserved when the first piece of clothing is deformed.

19. The apparatus of claim 15, wherein the second distance is one of a plurality of distinct distances that separate the second outer feature points of the second outer cage of the second piece of clothing from the second inner cage of the second piece of clothing.

20. The apparatus of claim 15, wherein the first outer cage of the first piece of clothing envelopes a mesh of the first piece of clothing, and wherein the second outer cage of the second piece of clothing envelopes a mesh of the second piece of clothing.

* * * * *